(12) United States Patent
Frank et al.

(10) Patent No.: US 11,221,434 B2
(45) Date of Patent: Jan. 11, 2022

(54) SUNLIGHT INTENSITY OR CLOUD DETECTION WITH VARIABLE DISTANCE SENSING

(71) Applicant: View, Inc., Milpitas, CA (US)

(72) Inventors: Trevor Frank, San Jose, CA (US); Alexander Rumer, Santa Clara, CA (US); Brandon Tinianov, Santa Clara, CA (US); James Fox, Ramona, CA (US); Douglas S. Silkwood, Santa Clara, CA (US); Erich R. Klawuhn, Los Altos, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 16/262,775

(22) Filed: Jan. 30, 2019

(65) Prior Publication Data

US 2019/0235129 A1     Aug. 1, 2019

Related U.S. Application Data

(63) Continuation of application No. 15/513,535, filed as application No. PCT/US2015/053041 on Sep. 29, 2015, now Pat. No. 10,234,596.

(Continued)

(51) Int. Cl.
*G01W 1/12* (2006.01)
*G01J 3/42* (2006.01)
(Continued)

(52) U.S. Cl.
CPC ............ *G01W 1/12* (2013.01); *G01J 1/1626* (2013.01); *G01J 3/42* (2013.01); *G01J 5/00* (2013.01);
(Continued)

(58) Field of Classification Search
CPC ... G01W 1/12; G01W 1/02; G01J 3/42; G01J 1/1626; G01J 2001/4266; G01J 5/00;
(Continued)

(56) References Cited

U.S. PATENT DOCUMENTS 3,675,023 A   7/1972   Kunke et al.
4,171,911 A   10/1979  Aberle et al.
(Continued)

FOREIGN PATENT DOCUMENTS

CH       707305 A1    6/2014
CN    200966026 Y    10/2007
(Continued)

OTHER PUBLICATIONS

Preliminary Amendment dated Feb. 20, 2018 in U.S. Appl. No. 15/287,646.
(Continued)

*Primary Examiner* — Sang H Nguyen
(74) *Attorney, Agent, or Firm* — Weaver Austin Villeneuve & Sampson LLP; Brian D. Griedel

(57) ABSTRACT

Certain aspects pertain to a cloud detector comprising a first detector module directed to a first region of the sky and a second detector module directed to a second region of the sky. Each detector module has a tube enclosing one or more sensing elements. The one or more sensing elements of the first detector module are configured to take weather condition readings from the first region of the sky. The one or more sensing elements of the second detector module are configured to take weather condition readings from the second region of the sky. In one aspect, the cloud detector is configured to detect cloud cover based on these weather condition readings. In some cases, the one or more sensing elements comprise an infrared radiation detector (e.g., ther-
(Continued)

mopile) for measuring infrared radiation intensity and a photosensor element for measuring sunlight intensity.

35 Claims, 15 Drawing Sheets

Related U.S. Application Data

(60) Provisional application No. 62/057,121, filed on Sep. 29, 2014.

(51) Int. Cl.
| | | |
|---|---|---|
| *G01J 1/16* | (2006.01) | |
| *G01J 5/00* | (2006.01) | |
| *G01W 1/02* | (2006.01) | |
| *G01J 1/42* | (2006.01) | |

(52) U.S. Cl.
CPC ....... *G01W 1/02* (2013.01); *G01J 2001/4266* (2013.01)

(58) Field of Classification Search
CPC .. G06K 9/0063; G06K 9/4647; G06K 9/4652; G06K 9/6284; B64D 47/08; G08G 5/0091
See application file for complete search history.

(56) References Cited

U.S. PATENT DOCUMENTS

| | | | |
|---|---|---|---|
| D256,787 S | 9/1980 | Peterson | |
| D258,871 S | 4/1981 | Rajotte, Jr. et al. | |
| 4,355,896 A | 10/1982 | Laue et al. | |
| 4,491,727 A | 1/1985 | Appelbaum et al. | |
| D278,132 S | 3/1985 | Powell | |
| 4,628,206 A * | 12/1986 | Astheimer | G01S 3/7868 250/372 |
| 4,690,553 A * | 9/1987 | Fukamizu | G01W 1/14 250/341.8 |
| 4,742,236 A * | 5/1988 | Kawakami | G08B 17/12 250/554 |
| 5,489,777 A * | 2/1996 | Stedman | G01J 5/602 250/338.5 |
| 5,606,393 A | 2/1997 | Schoenherr et al. | |
| 5,621,526 A | 4/1997 | Kuze | |
| 5,656,807 A | 8/1997 | Packard | |
| 5,670,774 A | 9/1997 | Hill | |
| 5,838,432 A | 11/1998 | Tokuhashi et al. | |
| 6,104,513 A | 8/2000 | Bloom | |
| D439,532 S | 3/2001 | Off et al. | |
| 6,269,763 B1 | 8/2001 | Woodland | |
| 6,417,500 B1 | 7/2002 | Wood | |
| 6,466,312 B1 | 10/2002 | Li | |
| 7,049,602 B2 | 5/2006 | Tokhtuev et al. | |
| 7,079,944 B2 | 7/2006 | Litchfield et al. | |
| 7,105,800 B1 * | 9/2006 | Staerzl | B63C 9/0011 250/221 |
| 7,472,590 B2 | 1/2009 | Solheim et al. | |
| 7,562,928 B1 | 7/2009 | Morazan | |
| 7,587,289 B1 | 9/2009 | Sivertsen | |
| 7,714,290 B2 * | 5/2010 | Kudoh | G01J 5/602 250/339.15 |
| 7,873,490 B2 | 1/2011 | MacDonald | |
| 8,102,586 B2 | 1/2012 | Albahri | |
| 8,254,013 B2 | 8/2012 | Mehtani et al. | |
| 8,270,059 B2 | 9/2012 | Friedman et al. | |
| 8,300,298 B2 | 10/2012 | Wang et al. | |
| 8,432,603 B2 | 4/2013 | Wang et al. | |
| 8,456,729 B2 | 6/2013 | Brown et al. | |
| 8,582,193 B2 | 11/2013 | Wang et al. | |
| 8,681,073 B1 * | 3/2014 | Robbins | H04N 21/42202 345/7 |
| 8,705,162 B2 | 4/2014 | Brown et al. | |
| 8,754,983 B2 | 6/2014 | Sutton | |
| 8,764,950 B2 | 7/2014 | Wang et al. | |
| 8,764,951 B2 | 7/2014 | Wang et al. | |
| D712,759 S | 9/2014 | Forsberg et al. | |
| D723,600 S | 3/2015 | Nauli et al. | |
| D725,284 S | 3/2015 | Karlsson et al. | |
| D727,467 S | 4/2015 | Batiste | |
| 9,164,002 B2 | 10/2015 | Anderson | |
| D747,988 S | 1/2016 | Matsumiya et al. | |
| D748,508 S | 2/2016 | Park et al. | |
| 9,261,751 B2 | 2/2016 | Pradhan et al. | |
| D761,135 S | 7/2016 | Allen, Sr. et al. | |
| 9,406,028 B2 | 8/2016 | Humann | |
| 9,506,802 B2 | 11/2016 | Chu et al. | |
| D780,612 S | 3/2017 | Alexander et al. | |
| 9,638,978 B2 | 5/2017 | Brown et al. | |
| 9,664,974 B2 | 5/2017 | Kozlowski et al. | |
| 9,746,181 B2 * | 8/2017 | Mori | F23N 5/242 |
| D816,518 S | 5/2018 | Brown et al. | |
| 10,063,815 B1 | 8/2018 | Spivey et al. | |
| 10,234,596 B2 | 3/2019 | Frank et al. | |
| 10,533,892 B2 | 1/2020 | Brown et al. | |
| 10,539,456 B2 | 1/2020 | Klawuhn et al. | |
| 10,690,540 B2 | 6/2020 | Brown et al. | |
| 10,732,028 B2 | 8/2020 | Klawuhn et al. | |
| 10,802,372 B2 | 10/2020 | Brown | |
| 10,895,498 B2 | 1/2021 | Klawuhn et al. | |
| 2002/0075472 A1 | 6/2002 | Holton | |
| 2003/0076480 A1 | 4/2003 | Burbulla | |
| 2004/0043760 A1 | 3/2004 | Rosenfeld et al. | |
| 2004/0047518 A1 * | 3/2004 | Tiana | G06T 5/50 382/284 |
| 2004/0108191 A1 | 6/2004 | Su et al. | |
| 2004/0135989 A1 | 7/2004 | Klebe | |
| 2006/0038983 A1 | 2/2006 | Bickel et al. | |
| 2006/0207730 A1 * | 9/2006 | Berman | E06B 9/32 160/310 |
| 2006/0238860 A1 * | 10/2006 | Baun | G01S 3/7867 359/429 |
| 2007/0012349 A1 | 1/2007 | Gaudiana et al. | |
| 2007/0145252 A1 | 6/2007 | Litchfield et al. | |
| 2008/0128586 A1 * | 6/2008 | Johnson | G01S 3/7861 250/203.4 |
| 2008/0173818 A1 * | 7/2008 | Staerzl | B63C 11/48 250/349 |
| 2008/0174455 A1 * | 7/2008 | Staerzl | G08B 21/086 340/984 |
| 2009/0027759 A1 | 1/2009 | Albahri | |
| 2009/0079349 A1 | 3/2009 | Sibalich et al. | |
| 2009/0254222 A1 | 10/2009 | Berman et al. | |
| 2009/0281820 A1 | 11/2009 | Sarkar et al. | |
| 2009/0316671 A1 | 12/2009 | Rolf et al. | |
| 2009/0326709 A1 | 12/2009 | Hooper et al. | |
| 2010/0100324 A1 | 4/2010 | Caminiti et al. | |
| 2010/0235206 A1 | 9/2010 | Miller et al. | |
| 2011/0308318 A1 | 12/2011 | Magnussen | |
| 2012/0006110 A1 | 1/2012 | Niemann et al. | |
| 2012/0007507 A1 | 1/2012 | Niemann et al. | |
| 2012/0070071 A1 | 3/2012 | Rankin et al. | |
| 2012/0089257 A1 | 4/2012 | Holger | |
| 2012/0133513 A1 | 5/2012 | Berman et al. | |
| 2012/0239209 A1 | 9/2012 | Brown et al. | |
| 2012/0323382 A1 | 12/2012 | Kamel et al. | |
| 2013/0021659 A1 | 1/2013 | Friedman et al. | |
| 2013/0057937 A1 | 3/2013 | Berman et al. | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Brown | |
| 2014/0055014 A1 | 2/2014 | Pan | |
| 2014/0067733 A1 | 3/2014 | Humann | |
| 2014/0117852 A1 | 5/2014 | Zhai et al. | |
| 2014/0236323 A1 | 8/2014 | Brown et al. | |
| 2014/0262057 A1 | 9/2014 | Chambers et al. | |
| 2014/0268287 A1 | 9/2014 | Brown et al. | |
| 2014/0300945 A1 | 10/2014 | Parker | |
| 2015/0070190 A1 | 3/2015 | Wai Fong et al. | |
| 2015/0161515 A1 | 6/2015 | Matsuoka | |
| 2015/0177415 A1 | 6/2015 | Bing | |
| 2015/0316473 A1 * | 11/2015 | Kester | G01J 3/2803 250/339.02 |

(56) References Cited

U.S. PATENT DOCUMENTS

| | | |
|---|---|---|
| 2016/0054633 A1 | 2/2016 | Brown et al. |
| 2016/0090098 A1 | 3/2016 | Kim et al. |
| 2016/0127642 A1 | 5/2016 | Schechner et al. |
| 2016/0277688 A1 | 9/2016 | Gaskamp et al. |
| 2016/0283774 A1 | 9/2016 | Buchanan et al. |
| 2017/0031056 A1 | 2/2017 | Vega-Avila et al. |
| 2017/0097259 A1 | 4/2017 | Brown et al. |
| 2017/0122802 A1 | 5/2017 | Brown |
| 2017/0125875 A1 | 5/2017 | Courtney et al. |
| 2017/0276542 A1 | 9/2017 | Klawuhn et al. |
| 2017/0293049 A1 | 10/2017 | Frank et al. |
| 2019/0171081 A1 | 6/2019 | Zedlitz et al. |
| 2019/0250029 A1 | 8/2019 | Zedlitz et al. |
| 2020/0063490 A1 | 2/2020 | Hebeisen et al. |
| 2020/0200595 A1 | 6/2020 | Klawuhn et al. |
| 2020/0209057 A1 | 7/2020 | Brown et al. |
| 2020/0278245 A1 | 9/2020 | Brown et al. |
| 2020/0363261 A1 | 11/2020 | Klawuhn et al. |
| 2021/0080319 A1 | 3/2021 | Brown et al. |
| 2021/0108960 A1 | 4/2021 | Klawuhn et al. |
| 2021/0190991 A1 | 6/2021 | Frank et al. |

FOREIGN PATENT DOCUMENTS

| | | | |
|---|---|---|---|
| CN | 201104273 Y | 8/2008 | |
| CN | 101702036 A | 5/2010 | |
| CN | 101969207 A | 2/2011 | |
| CN | 102183237 A | 9/2011 | |
| CN | 102183237 B | 8/2012 | |
| CN | 104181612 A | 12/2014 | |
| CN | 104321497 A | 1/2015 | |
| CN | 204155059 U | 2/2015 | |
| CN | 204422071 U | 6/2015 | |
| EP | 0067706 B1 | 2/1991 | |
| EP | 1012633 B1 | 3/2002 | |
| EP | 2357544 A2 | 8/2011 | |
| EP | 2518254 A1 | 10/2012 | |
| ES | 2308936 A1 | 12/2008 | |
| JP | 2004-170350 A | 6/2004 | |
| JP | 2014-062801 A | 4/2014 | |
| TW | 201217999 A | 5/2012 | |
| TW | 201403034 A | 1/2014 | |
| WO | WO99/13359 A1 | 3/1999 | |
| WO | WO-2005052524 A1 * | 6/2005 | ........... G08B 17/125 |
| WO | WO2011/124720 | 10/2011 | |
| WO | WO2013/105244 A1 | 7/2013 | |
| WO | WO2013/181408 A2 | 12/2013 | |
| WO | WO2014/121863 | 8/2014 | |
| WO | WO2015/095615 A1 | 6/2015 | |
| WO | WO2015/171886 | 11/2015 | |
| WO | WO2016/004109 A1 | 1/2016 | |
| WO | WO2016/053960 | 4/2016 | |
| WO | WO2016/054112 | 4/2016 | |
| WO | WO2017/007942 | 1/2017 | |
| WO | WO2017/062592 | 4/2017 | |
| WO | WO2017/189437 | 11/2017 | |
| WO | WO2017/210346 A1 | 12/2017 | |
| WO | WO2018/067996 | 4/2018 | |
| WO | WO2019/183232 | 9/2019 | |
| WO | WO2021080879 | 4/2021 | |

OTHER PUBLICATIONS

U.S. Office Action dated May 5, 2017 in Design U.S. Appl. No. 29/560,076.
U.S. Notice of Allowance dated Dec. 12, 2017 in Design U.S. Appl. No. 29/560,076.
U.S. Office Action dated Aug. 2, 2017 in U.S. Appl. No. 14/998,019.
U.S. Office Action dated Jun. 8, 2018 in U.S. Appl. No. 14/998,019.
U.S. Final Office Action dated Jan. 17, 2019 in U.S. Appl. No. 14/998,019.
U.S. Office Action dated Jun. 14, 2019 in U.S. Appl. No. 14/998,019.
U.S. Office Action dated Aug. 9, 2018 in U.S. Appl. No. 15/287,646.
U.S. Final Office Action dated Feb. 21, 2019 in U.S. Appl. No. 15/287,646.
U.S. Office Action dated Jan. 22, 2018 in U.S. Appl. No. 15/514,480.
U.S. Final Office Action dated Sep. 26, 2018 in U.S. Appl. No. 15/514,480.
U.S. Notice of Allowance dated Jan. 24, 2019 in U.S. Appl. No. 15/514,480.
U.S. Notice of Allowance dated May 23, 2019 in U.S. Appl. No. 15/514,480.
U.S. Office Action dated Jun. 29, 2018 in U.S. Appl. No. 15/513,535.
U.S. Notice of Allowance dated Nov. 1, 2018 in U.S. Appl. No. 15/513,535.
Canadian Office Action dated Apr. 11, 2017 in CA Design Application No. 170770.
Canadian Office Action dated Nov. 15, 2017 in CA Design Application No. 170770.
Chinese Office Action dated Apr. 27, 2017 in CN Design Application No. 201630492174.4.
Chinese Office Action dated Apr. 3, 2018 in CN Application No. 201580059148.5.
Chinese Office Action dated Feb. 2, 2019 in CN Application No. 201580059148.5.
Extended European Search Report dated May 3, 2018 in EP Application No. 15848030.1.
Russian Office Action & Search Report dated Apr. 1, 2019 in RU Application No. 2017114996.
International Preliminary Report on Patentability dated Apr. 13, 2017 in PCT/US2015/052822.
International Search Report and Written Opinion dated Jan. 14, 2016 in PCT/US2015/052822.
Chinese Office Action dated Mar. 25, 2019 in CN Application No. 201580052861.7.
Extended European Search Report dated Apr. 26, 2018 in EP Application No. 15845648.3.
European Office Action dated Feb. 21, 2019 in EP Application No. 15845648.3.
International Preliminary Report on Patentability dated Apr. 13, 2017 in PCT/US2015/053041.
International Search Report and Written Opinion dated Dec. 18, 2015 in PCT/US2015/053041.
Australian Examination Report dated May 31, 2019 in AU Application No. 2016334038.
European Examination Report dated Jul. 11, 2019 in EP Application No. 16854302.3.
International Preliminary Report on Patentability dated Apr. 19, 2018 in PCT/US2016/055709.
International Search Report and Written Opinion dated Dec. 15, 2016 in PCT/US2016/055709.
International Preliminary Report on Patentability dated Apr. 18, 2019 in PCT/US17/55631.
International Search Report and Written Opinion dated Jan. 25, 2018 in PCT/US17/55631.
International Preliminary Report on Patentability dated Dec. 12, 2018 in PCT/US17/35290.
International Search Report and Written Opinion dated Sep. 8, 2017, issued in PCT/US17/35290.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD,.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council, "Cloud Radar: Predicting The Weather More Accurately," ScienceDaily.com, Oct. 1,

(56) References Cited

OTHER PUBLICATIONS 2008, pp. 2. [webpage] [retrieved Sep. 17, 2014] <URL:http://www.sciencedaily.com/releases/2008/09/080924085200.htm>.
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration (NASA), "Cloud Remote Sensing and Modeling," [webpage] [retrieved Sep. 17, 2014] <URL: http://atmospheres.gsfc.nasa.gov/climate/index.php?section=134>.
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141,.
Clay, R.W., et al., "A cloud monitoring system for remote sites," Publications of the Astronomical Society of Australia, vol. 15, No. 3, Jan. 1998, pp. 332-335.
Idso, Sherwood B., "Humidity measurement by infrared thermometry," Remote Sensing of Environment, vol. 12, 1982, pp. 87-91.
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
Thompson, Marcus, "Boltwood cloud sensor," Cloudynights.com, Nov. 25, 2005, 6 pp. [online], [retrieved Dec. 15, 2016], Retrieved from the internet <URL http://www.cloudynights.com/page/articles/cat/user-reviews/photography/photography-accessories/boltwood-cloud-sensor-r1222>.
Werner, Christian, "Automatic cloud cover indicator system," Journal of Applied Meteorology, vol. 12, Dec. 1973, pp. 1394-1400.
Boltwood Cloud Sensor II by Diffraction Limited, 2016, [online], [retrieved Dec. 15, 2016], Retrieved from the internet <URL http://diffractionlimited.com/product/boltwood-cloud-sensor-ii/>.
Mims III, Forrest M., et al., "Measuring total column water vapor by pointing an infrared thermometer at the sky," Bulletin of the American Meteorological Society, Oct. 2011, pp. 1311-1320.
Sloan, Raymond, et al., "Infrared Emission Spectrum of the Atmosphere," Journal of the Optical Society of America, vol. 45, No. 6, Jun. 1955, pp. 455-460.
SurroundVideo Series, "Pioneering Multi-Sensor IP Megapixel Cameras," [webpage] 10 pp. [retrieved Jul. 24, 2015] <URL:http://web.archive.org/web/20150724235343/http://www.arecontvision.com/landing-pages/surround-video/overview.php>.
Melexis "MLX90614 family Datasheet" (3901090614, Rev. 004), Jul. 30, 2008, 42 pp.
C-Bus Multi-Sensors, posted on clipsal.com. [online] <URL: https://www.clipsal.com/Trade/Products/Integrated-Systems/C-Bus-Control-and-Management-System/C-Bus-1 nput -Units/Sensors-and- Detectors#. WOf1 LvkrlmE>.
Gen5 Z-Wave Plus 6-in-1 Multisensor, posted on thesmartesthouse.com, Earliest review on Aug. 27, 2015. [online] <URL:https://www.thesmartesthouse.com/products/aeotec-by-aeon-Iabs-z-wave-5-in-1-multisensor#shopify-product-reviews>.
"Sky temperature" in Designing Buildings Wiki, Apr. 26, 2015, <https://www.designingbuildings.co.uk/wiki/Sky_temperature> [retrieved Jul. 19, 2019].
U.S. Appl. No. 16/335,222, filed Mar. 20, 2019, Zedlitz et al.
Preliminary Amendment dated Mar. 12, 2020, in U.S. Appl. No. 16/695,057.
Preliminary Amendment dated May 7, 2020 in U.S. Appl. No. 16/696,887.
Preliminary Amendment dated May 8, 2020 in U.S. Appl. No. 16/696,887.
U.S. Notice of Allowance dated Sep. 9, 2019 in U.S. Appl. No. 15/287,646.
U.S. Notice of Allowance dated Sep. 6, 2019 in U.S. Appl. No. 15/514,480.
U.S. Notice of Allowance dated Jun. 1, 2020 in U.S. Appl. No. 16/695,057.
U.S. Notice of Allowance dated Jan. 23, 2020 in U.S. Appl. No. 14/998,019.
U.S. Notice of Allowance dated Apr. 29, 2020 in U.S. Appl. No. 14/998,019.
U.S. Office Action dated Jun. 11, 2020 in U.S. Appl. No. 16/303,384.
Examination Report No. 1, dated May 7, 2020, for Australian Patent Application No. 2015324000 3 pages.
Chinese Office Action dated Aug. 1, 2019 in CN Application No. 201580059148.5.
Chinese Office Action dated May 6, 2020 in CN Application No. 201580059148.5.
European Office Action dated Aug. 27, 2019 in EP Application No. 15848030.1.
Taiwanese Office Action dated Jun. 28, 2019 in TW Application No. 104131932.
Taiwanese Decision of Rejection dated Nov. 1, 2019 in TW Application No. 104131932.
Chinese Office Action dated Apr. 13, 2020 in CN Application No. 201580052861.7 with Translation.
International Search Report and Written Opinion (ISA:EPO) dated Jul. 5, 2019 in PCT/US19/23186.
European (Partial) Search Report dated Dec. 17, 2019 in EP Application No. 17807428.2.
"Halio Rooftop Sensor Kit (Model SR500)," Product Data Sheet, Kinestral Technologies, 2020, 4 pp.
"SPN1 Sunshine Pyranometer," Product Overview, Specification, Accessories and Product Resources, Delta-T Devices, May 5, 2016, 9 pp. <<https://www.delta-t.co.uk/product/spn1/ >> (downloaded Apr. 28, 2020).
Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].
U.S. Appl. No. 16/695,057, filed Nov. 25, 2019, Klawuhn et al.
U.S. Appl. No. 16/696,887, filed Nov. 26, 2019, Brown et al.
U.S. Appl. No. 16/871,976, filed May 11, 2020, Brown et al.
U.S. Appl. No. 16/946,168, filed Jun. 8, 2020, Klawuhn et al.
U.S. Office Action dated Dec. 10, 2020 in U.S. Appl. No. 16/871,976.
U.S. Office Action dated Dec. 9, 2020 in U.S. Appl. No. 16/696,887.
U.S. Notice of Allowance dated Oct. 15, 2020 in U.S. Appl. No. 16/946,168.
Ex Parte Quayle Action, dated Feb. 2, 2021, in U.S. Appl. No. 16/335,222.
U.S. Office Action dated Mar. 3, 20121 in U.S. Appl. No. 16/303,384.
Chinese Office Action dated Dec. 1, 2020 in CN Application No. 201580059148.5, with English Translation.
Chinese Rejection Decision dated Mar. 19, 2021 in CN Application No. 201580059148.5, without English Translation.
European Office Action dated Feb. 3, 2021 in EP Application No. 15848030.1.
Chinese Office Action dated Dec. 10, 2020 in CN Application No. 201580052861.7 with Translation.
Chinese Office Action dated Feb. 23, 2021 in CN Application No. 201680062708.7 with English Translation.
Indian First Examination Report dated Mar. 15, 2021 in Indian Patent Application No. 201837010260.
Chinese Office Action dated Jan. 12, 2021 in CN Application No. 201780065447.9 with Translation.
International Preliminary Report on Patentability dated Sep. 22, 2020 in PCT/US19/23186.
International Search Report and Written Opinion (ISA:EPO) dated Feb. 22, 2021 in PCT/US2020/056164.
U.S. Appl. No. 17/249,595, filed Mar. 5, 2021, Frank et al.
Preliminary Amendment dated Jan. 6, 2021, in U.S. Appl. No. 16/949,493.

(56) References Cited

OTHER PUBLICATIONS

Preliminary Amendment dated Mar. 8, 2021, in U.S. Appl. No. 17/249,595.
Indian First Examination Report dated Sep. 17, 2020 in Indian Patent Application No. 201737011527.
Australian Examination Report dated Aug. 20, 2020 in AU Application No. 2016334038.
Chinese Office Action dated Nov. 20, 2019 in CN Application No. 201680062708.7 with Translation.
Chinese Office Action dated Aug. 17, 2020 in CN Application No. 201680062708.7 with Translation.
Taiwan Office Action dated Jul. 2, 2020 in Taiwan Patent Application No. 105132457 with Translation.
U.S. Notice of Allowance dated Jul. 15, 2021 in in U.S. Appl. No. 16/871,976.
U.S. Office Action dated Jul. 13, 2021 in U.S. Appl. No. 16/696,887.
U.S. Notice of Allowance dated Apr. 14, 2021 in U.S. Appl. No. 16/335,222.
Taiwanese Notice of Allowance, dated Jan. 25, 2021 in TW Application No. 104131932 No translation.
Australian Examination Report dated Jul. 9, 2021 in AU Application No. 2020250299.
Taiwan Notice of Allowance dated Mar. 4, 2021 in Taiwan Patent Application No. 105132457. No translation.
Taiwan Notice of Allowance dated Jun. 29, 2021 in Taiwan Patent Application No. 110115755. with English translation.
Indian First Examination Report dated Jul. 7, 2021 in Indian Patent Application No. 201917013204.
Taiwan Office Action dated May 13, 2021 in Taiwan Patent Application No. 106134521 with English Translation.
Smith, et al. "Measuring Cloud Cover and Brightness Temperature with a Ground Based Thermal Infrared Camera", (Feb. 2008), American Meteorological Society, vol. 47, pp. 683-693.
Merriam-Webster, Inc., "Pyrometer," Merriam-Webster's Collegiate Dictionary 10th Edition, 2001, Springfield, MA, p. 950 (4 pp.).
CN Office Action dated Aug. 4, 2021, in CN Application No. 201780039437.8.
English translation of CN201104273 description form worldwide. espacenet.com.
English translation of JP2004170350 description form worldwide. espacenet.com.
Extended European Search Report dated Jul. 16, 2021 in EP Application No. 21150305.7.
U.S. Corrected Notice of Allowance dated Aug. 19, 2021 in U.S. Appl. No. 16/871,976.
U.S. Non-Final Office Action dated Sep. 13, 2021, in U.S. Appl. No. 17/027,601.
U.S. Notice of Allowance dated Aug. 3, 2021 in U.S. Appl. No. 16/335,222.
CN Notice of allowance dated Oct. 11, 2021, in application No. CN20158059148.5.
CN Office action dated Nov. 3, 2021, in CN Application No. CN20178065447.
EP Office Action dated Oct. 1, 2021, in application No. EP17807428.2.
Notice of Allowance dated Oct. 14, 2021 in U.S. Appl. No. 16/871,976.
Notice of Allowance dated Oct. 27, 2021 in U.S. Appl. No. 16/335,222.
U.S. Non-Final Office Action dated Oct. 18, 2021 in U.S. Appl. No. 16/949,493.

* cited by examiner

SUNLIGHT INTENSITY OR CLOUD DETECTION WITH VARIABLE DISTANCE SENSING

CROSS-REFERENCE TO RELATED APPLICATIONS

This application is a continuation of U.S. patent application Ser. No. 15/513,535, filed on Mar. 22, 2017 and titled "SUNLIGHT INTENSITY OR CLOUD DETECTION WITH VARIABLE DISTANCE SENSING," which claims priority under 35 U.S.C. § 371 to International Application PCT/US15/53041 (designating the United States), titled "SUNLIGHT INTENSITY OR CLOUD DETECTION WITH VARIABLE DISTANCE SENSING," filed on Sep. 29, 2015, which claims priority to and benefit of U.S. Provisional Application No. 62/057,121, titled "SUNLIGHT INTENSITY OR CLOUD DETECTION WITH VARIABLE DISTANCE SENSING," filed on Sep. 29, 2014; each of which is hereby incorporated by reference in its entirety and for all purposes.

FIELD

The present disclosure generally relates to arrangements of sensing elements for detecting weather conditions, and in particular to systems and methods for detecting cloud conditions.

BACKGROUND

Detecting cloud cover and other weather conditions can be an important part of making decisions about placing equipment into operation at, for example, a robotic observatory since rain and other weather conditions may damage astronomical equipment. Furthermore, astronomers may want to detect clouds that interfere with their observations. Conventional methods of mapping the sky for detecting cloud cover rely on expensive imaging devices that typically rely on visible light measurements.

SUMMARY

Certain aspects pertain to a cloud detector comprising a first detector module directed to a first region of the sky and a second detector module directed to a second region of the sky. The first director module can be a near detector module and the second director module can be a far detector module where the first near detector module is directed to a first region of the sky closer to a building than the second far direction module. Each of the detector modules has a tube enclosing one or more sensing elements. The one or more sensing elements of the first detector module are configured to take weather condition readings from the first region of the sky. The one or more sensing elements of the second detector module are configured to take weather condition readings from the second region of the sky. In one aspect, the cloud detector is configured to detect cloud cover based on these weather condition readings. In some cases, the one or more sensing elements of each of the detector modules comprises an infrared radiation detector (e.g., thermopile) for measuring infrared radiation intensity and a photosensor element for measuring sunlight intensity. In one example, the thermopile is configured to measure an intensity of infrared radiation with wavelengths in a range between 8 μm and 14 μm. In another example, the thermopile is configured to measure an intensity of infrared radiation with wavelengths above 5 μm.

In some aspects, a cloud detector comprises a first detector module directed to a first region of the sky and a second detector module directed to a second region of the sky. Each of the detector modules has a tube enclosing one or more sensing elements. The one or more sensing elements of the first detector module are configured to take weather condition readings from the first region of the sky. The one or more sensing elements of the second detector module are configured to take weather condition readings from the second region of the sky. In one aspect, the first and second modules are in an array of detector modules such as, for example, in a honeycomb arrangement. In one case, the cloud detector further comprises a transparent covering over the array of detector modules. In one aspect, the cloud detector is configured to detect cloud cover based on these weather condition readings. In some cases, the one or more sensing elements of each of the detector modules comprises an infrared radiation detector (e.g., thermopile) for measuring infrared radiation intensity and a photosensor element for measuring sunlight intensity. In one example, the thermopile is configured to measure an intensity of infrared radiation with wavelengths in a range between 8 μm and 14 μm. In another example, the thermopile is configured to measure an intensity of infrared radiation with wavelengths above 5 μm.

In some aspects, a cloud detector comprises a detector module with a tube and one or more sensing elements configured within the tube restricting the field of view of the one or more sensing element. The cloud detector further comprises a two axis gimbal having a first arm and a second arm extending from a base at different angles, wherein the detector module is mounted to a distal end of the second arm. The cloud detector further comprises a counterbalance mounted to a distal end of the first arm and an axial member with a first axis. The two axis gimbal is connected to the axial member and is rotatably connected at the pivot to the axial member. The cloud detector further comprises a motor configured to rotate the axial member to cause the detector module to rotate about the first axis, wherein rotating the axial member at high speeds causes the detector module to rotate about the second axis. At different rotations about the first and second axis, the detector module is directed to different regions of the sky, wherein the sensing elements within the detector module are configured to take weather condition readings from the different regions of the sky. In one aspect, the cloud detector is configured to detect cloud cover based on the weather condition readings from the different regions of the sky. In some cases, the one or more sensing elements of each of the detector modules comprises an infrared radiation detector (e.g., thermopile) for measuring infrared radiation intensity and a photosensor element for measuring sunlight intensity. In one example, the thermopile is configured to measure an intensity of infrared radiation with wavelengths in a range between 8 μm and 14 μm. In another example, the thermopile is configured to measure an intensity of infrared radiation with wavelengths above 5 μm.

Some aspects pertain to a method comprising directing one or more detector modules to at least two regions of the sky, measuring sensor data from the at least two regions of the sky, determining cloud cover at each of the at least two regions of the sky based on the measured sensor data, and classifying the cloud cover based on the sensor data. In some cases, the method further comprises determining a speed of the cloud cover based on the sensor data and using the speed to classify the cloud cover. In one case, directing one or more detector modules to at least two regions of the sky comprises rotating one of the detector modules.

Some aspects pertain to a cloud detector comprising a first detector module aimed at a first region of the sky, one or more sensing elements of the first detector module, and a tube enclosing the one or more sensing elements of the first detector module, the tube restricting field of view to the first region of the sky, wherein the one or more sensing elements are configured to detect cloud cover.

These and other features and embodiments will be described in more detail below with reference to the drawings.

BRIEF DESCRIPTION OF THE FIGURES

FIG. 4B is a graph illustrating the functionality of a humidity sensor as a sensing element in a cloud detector, according to embodiments.

DETAILED DESCRIPTION

Figure 1A:
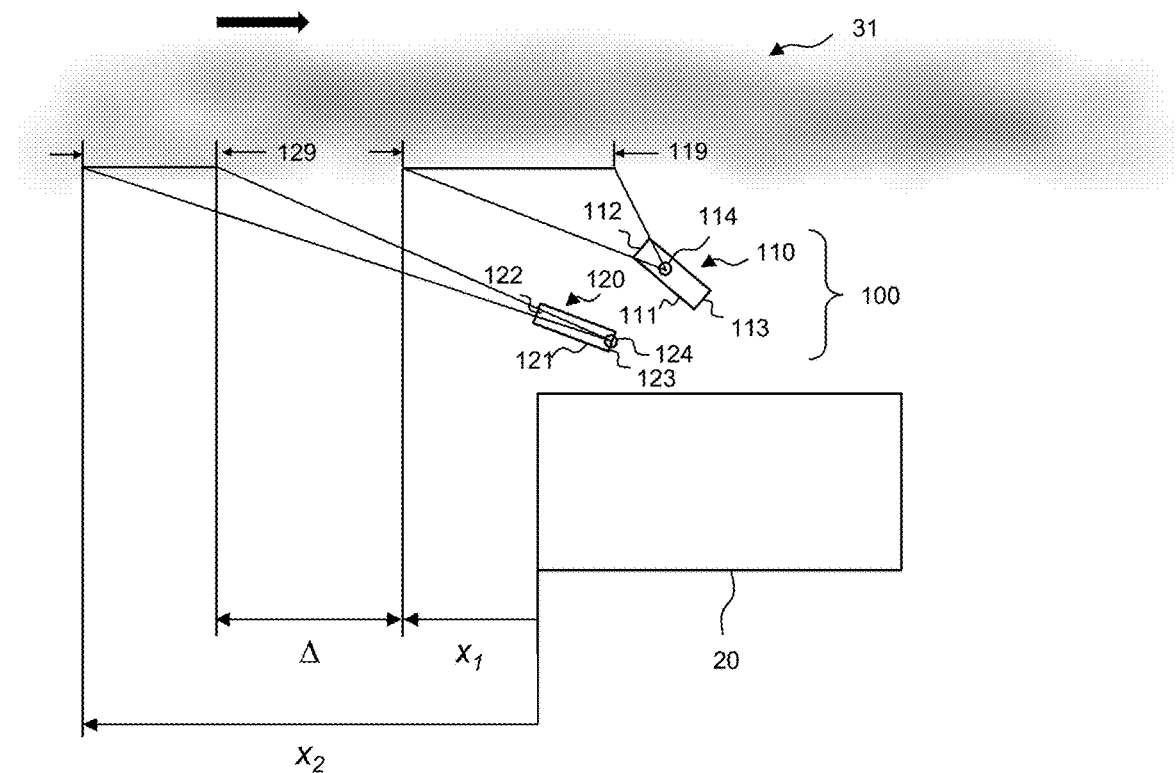
FIGS. 1A, 1B, 1C, and 1D are schematic diagrams of a cloud sensor with near and far detector modules at a building under four different cloud scenarios, according to embodiments

Part A—Cloud Detectors
I. Introduction

In certain embodiments, a cloud detector can measure detectable characteristics of clouds and other weather conditions at different regions of the sky. These readings are associated with different distances from the building. Multiple readings taken by these detector modules can be used to detect clouds and/or other weather conditions and determine the speed of clouds and/or other weather conditions. For example, the intensity of radiation measured by a sensing element may be related to the density of the cloud. This intensity reading can be used to detect a cloud and also to determine the properties of the cloud. As another example, the cloud travel direction can be predicted by analyzing changes in energy gathered by each detector module over time.

In energy efficient buildings, control logic may consider cloud cover when setting levels of its building systems. For example, in buildings with optically switchable windows, control logic may consider cloud cover in setting window optical states (e.g., tint states). However, it has been difficult to detect incoming clouds in sufficient time to change window states before a cloud arrives or departs, because electrochromic windows, particularly the large-area type having viewable areas on the order of 50 $ft^2$, may take up to thirty minutes to switch. Conventional systems that purport to provide this functionality employ expensive sensing equipment. Such systems may map the entire sky and track clouds with some accuracy but require customized integration. The mapping technology is also hampered by not being able to register clouds until there is enough light to see them. Thus, by the time this occurs, the windows may already need to have their tint state changed.

Some optically switchable windows tint quickly, however a window control system that changes window tint state in response to every change in cloud cover may, during some weather conditions, produce annoyingly frequent fluctuations in tint state. Therefore, it would be useful to detect incoming cloud cover at a distance sufficient for the window control logic to determine whether a tint change in response to current conditions would need to be undone, e.g. due to incoming cloud cover—whether the optically switchable window tints quickly or not.

In some cases, window control logic may make tint state change decisions accounting for the window's tinting transition time, which may be five, ten, twenty minutes or more. In some window designs, once started, a window tint state transition must run to completion before another transition can be undertaken. In other words, a tinting decision must complete execution before the next tinting decision can begin. For example, a first decision to tint from 40% to 5% transparency may be shortly followed by a decision to tint from 5% to 20%. However, in some window tinting technologies, the transition from 40% to 5% can't be aborted before reaching 5%.

An example of electrochromic (EC) window control logic that can make predictive tinting decisions accounting for transition time is described in PCT application PCT/US15/29675 titled "CONTROL METHOD FOR TINTABLE WINDOWS," and filed on May 7, 2015, which is hereby incorporated by reference in its entirety. In this example, tinting decisions at a current time may be based on predicted solar irradiance from a solar calculator determined at a future look-ahead time. This look-ahead time may be based on the time it takes to transition the window to the new tint state. In some instances, the window control logic will decide to start transitioning the EC window ahead of time so that the EC window will be in the appropriate tint state at the future look-ahead time when the solar irradiance will be at the predicted levels. For example, if high solar irradiance levels are predicted to occur in 10 minutes and it takes 10 minutes to transition the windows to a higher level of tint (more tinted) appropriate for those high solar irradiance levels, the EC window control logic may decide to start transitioning the windows at this time so that the windows have been fully transitioned by time it is predicated the high levels of solar irradiance will occur. In some embodiments, the look-ahead time to determine whether to change tint or clear may be in the range of about 30 minutes to 40 minutes ahead of the predicted condition.

In certain embodiments, a cloud detector can be used to determine (detect and/or predict) cloud cover at the building. With single or multiple sensing elements (e.g., photometer, solar cell elements, CMOS/CCD element, thermopile, photodiode, etc.), a cloud detector can identify cloud cover vs. full sun by, for example, using thresholding. For example, a thermopile may be used to measure infrared (IR) radiant flux that can be used to detect clouds. Coupling these sensing technologies with a tube that can restrict the field of view, the cloud detector can target sensing element(s) to specific areas of the sky at varying distances from the building. Using the information from different areas of the sky, the cloud detector can make sunny vs. cloud day determinations as well as predicting cloud cover and other changing weather conditions. These determinations can be used as input to window control logic to make tinting decisions for EC windows or used as input into other control logic for other building systems. An example of such window control logic is described in PCT application PCT/US15/29675 titled "CONTROL METHOD FOR TINTABLE WINDOWS," and filed on May 7, 2015. In one embodiment, the cloud detector can use readings from the sensing element(s) and information from a laser, sonar, or other type of range finder to further map the buildings and resulting shadows to more specifically respond to atmospheric changes. In another embodiment, a cloud detector may be further configured to map the position of the sun and/or the moon. In this case, the data from the cloud detector may be used to replace a solar calculator or use in addition to data from a solar calculator.

II. Examples of Cloud Detector Systems

According to certain aspects, a cloud detector system generally includes one or more detector modules designed to determine (detect and/or predict) cloud cover, sunlight intensity, and other weather related conditions at a structure such as a building. Each detector module is designed to measure properties of reflected electromagnetic radiation (EMR) or other detectable characteristics of clouds and other weather related conditions from a limited region of the sky. In other words, these detector modules are directional. Each detector module may be aimed at a different region of the sky and measure properties based on its field of view at a given time. In one embodiment, for example, a detector module is limited to measuring characteristics of clouds over a solid angle of about $(\pi/180)^2$ steradians (the Standard International (SI) unit of solid angular measure). In another embodiment, a detector module is limited to measuring characteristics of clouds over a solid angle from about $(5\pi/180)^2$ steradians. In another embodiment, a detector module is limited to measuring detectable characteristics of clouds over a solid angle in the range of about $(\pi/180)^2$ steradians to about $(\pi/18)^2$ steradians.

The cloud detector system may have various design configurations as discussed in subsection A below. In some cases, a cloud detector may include an enclosure over its one or more of its detector modules. In some of the cases, the enclosure is a transparent material (e.g. glass, polycarbonate and the like) that is: hemispherical in shape or other partial portion of a spherical shape, conical in shape, and the like. The enclosure may serve as a protective cover Each detector module includes one or more discrete sensing elements. The intensity of reflected EMR from clouds and other detectable characteristics of clouds can be measured by these discrete sensing elements. For example, one type of sensing element may convert incoming photons into electrical energy in a signal that is a measure of intensity of the received radiation. As another example, one type of sensing element may change its material properties (e.g., resistance) in response to temperature fluctuations. Each type of sensing element measures detectable properties of the clouds within its own characteristic range of parameter values (e.g., range of wavelengths). For example, one sensing element may measure intensity of radiation over some or all of the visible spectrum of wavelengths, another sensing element may measure intensity of radiation within a range of wavelengths in the near infrared spectrum, and yet another sensing element may measure intensity of radiation within a range of wavelengths in the far infrared spectrum. Some examples of types of discrete sensing elements that can be used to detect cloud characteristics include thermistor elements, solar cell elements such as photodiodes, thermopiles, photometers elements (e.g., photoresistors, photodiodes, photomultipliers), and photosensor elements (e.g., complementary metal-oxide-semiconductor (CMOS) image sensing elements, charge-coupled device (CCD) image sensing elements, and the like). In one embodiment, a detector module contains a sensing element that is a photodiode. Depending on the material used to make the photodiode, different wavelength ranges can be measured.

Figure 8:
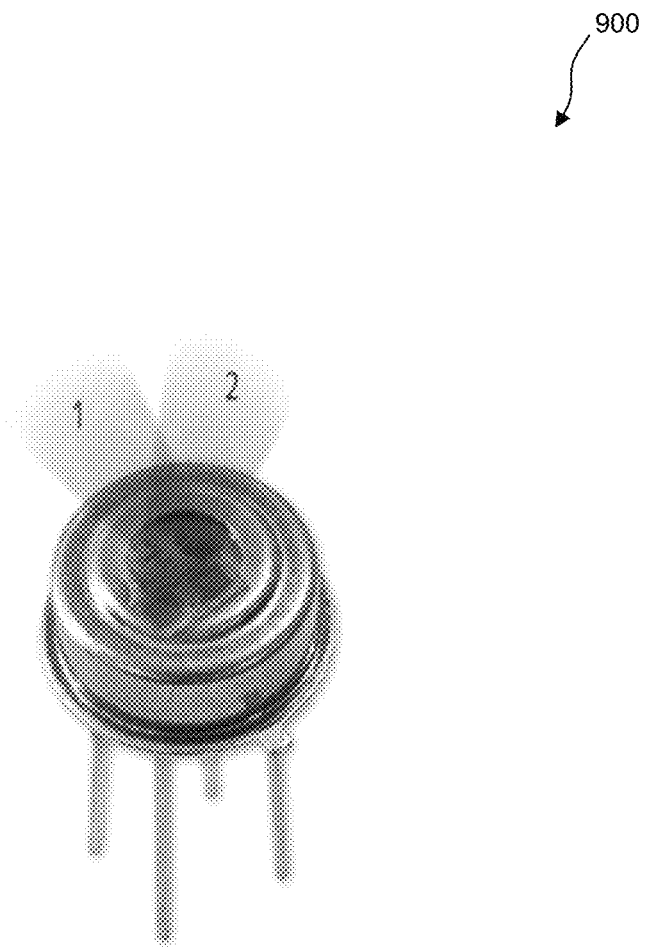
FIG. 8 is a photograph of a photodiode used in a cloud detector, according to embodiments.

FIG. 8 is a photograph of an example of a photodiode 900 that can be used as a sensing element in a cloud detector, according to embodiments. Another example of a sensing element that can be used in a cloud detector is an element from a CMOS or a CCD sensor array. When using either of these types of sensor arrays, the relative intensity or changes in infrared and visible light or even the appearance of light can be measured. A CMOS/CCD sensor array does not require multiple analog measurement channels to get data, each CMOS/CCD element (e.g., pixel) can be treated individually. Another example of a sensing element that can be used in a cloud detector is a section of a laser-scribed (partitioned) solar panel. In this case, the amount of power absorbed by each section of the solar panel can be used to correlate to the amount of sunlight coming from a specific direction. In this case, each section may need to be in communication with a separate measurement channel. Multiplexing (MUXing) can be used in these cases to combine data channels into one. Time-division multiplexing can be used to switch which channel is being polled at a fixed frequency and cycle through all of the channels. In certain cases, high data frequency may not be used. Another example of a sensing element that can be used in a cloud detector is a black body sensor or thermopile. In this example, the relative sunlight radiation can be derived from changes in temperature measured. In this example, each sensing element may need to be in communication with a separate input measurement channel.

A single detector module may contain one type of discrete sensing element or may contain multiple types of sensing elements (e.g., a thermopile and a photodiode). In certain embodiments, a detector module may include a sensing element in the form of a thermopile for measuring sky temperature which can be used to detect cloud cover. In one embodiment, the thermopile may be configured to respond to IR in the wavelength range of 8 μm to 14 μm. In certain embodiments, a detector module includes a sensing element for measuring infrared (e.g., a thermopile) and a sensing element for measuring intensity of visible light (e.g., a photosensor element such as a photodiode). The infrared measurement can be used to detect cloud cover. For example, a detector module may include a thermopile for measuring sky temperature to detect cloud cover and a photosensor to detect light intensity. In one embodiment, a detector module includes solar cell elements such as photodiodes.

In certain embodiments, the detector module includes a tube (e.g., cylinder or cone). As used herein, a "tube" refers to a structure that can restrict the field of view of the sensing element(s) within the tube. For example, a "tube" may be a cylinder of various cross-sectional shapes such as circular, oval, rectangular, etc. In another example, a "tube" may be of a conical shape, parabolic, hemispherical, box, etc. In another example, a "tube" may be a partition wall separating each compartment (e.g., cell) of an array (e.g., honeycomb structure) of detector modules where the partition wall is designed to restrict view to sensing elements of a particular detector module. The field of view of the sensing elements in the tube will be based on the dimensions of the tube and the location of the sensing elements within the tube. That is, the farther away the sensing elements are located away from the opening of the tube to the sky, the more restricted and smaller the field of view the sensing elements have of the sky.

In certain aspects, the tube of the detector module, location of the sensing elements, and aiming of the detector module are designed to constrain the field of view of the sensing element(s) within the tube to a particular region of the sky. For example, the detector module may include sensing element(s) enclosed within a tube that is aimed at that particular region of the sky. The sensing elements may be located at various depths within the tube to provide a particular field of view of the sky. In certain aspects, the sensing element(s) are located within the tube at a distance away from the opening end of the tube open to receive radiation from a limited region of the sky based on the field of view of the sensing elements. The sensing element(s) within the tube may be located at an inner surface of the tube in some cases or may be suspended in the interior of the tube in other cases. In one case, the sensing element may be located at the base end of the tube, the base end opposite the opening end.

The tube of the detector module generally includes one or more inner surfaces. A material coating (e.g., film) or coatings may be disposed over one or more of these inner surfaces. In one embodiment, the material coating may include a light or other energy absorptive material. In another embodiment, the material coating may include a light or other energy reflective material.

In some aspects, a cloud detector may include a sensing element of a standard photometer, solar cell, and/or CMOS/CCD in combination with thresholding operations to identify cloud cover or another temporary obstruction or identify that there is full sun exposure. In some cases, a thermopile can be used to detect clouds. Coupling these technologies with a tube that targets specific areas of the sky at varying distances from the building of which systems are being controlled, the cloud detector can identify sunny vs. cloudy days and/or identify clouds or changing weather conditions. In one example, a cloud detector includes a CMOS sensor or a specifically scribed solar cell in a hemispherical honeycomb enclosure that can be used to predict cloud travel direction by analyzing the changes in energy gathered in each section over time.

In certain aspects, a cloud detector includes a thermopile to detect cloud cover and a photometer that measures light intensity and uses thresholding to generate an intensity image. A cloud detector system may include several such pairs of associated thermopiles and photometer elements, for example, in a single housing with many tubes, e.g. a honeycomb structure or in another example, a cloud detector system may include a plurality of associated thermopile-photometer pairs, where each of the plurality of pairs has its own associated housing and/or tubes. The pairs may be in different geographical locations and distributed azimuthally to cover a region of the sky around a building or partially around a building, e.g. aimed toward incoming weather patterns in order to detect cloud cover and provide data to building control systems such as smart window tinting algorithms, solar tracking stations, and the like.

A. Cloud Detector System Configurations

A cloud detector system may have its components arranged in various configurations. In one configuration, the cloud detector includes an array of detector modules, with each detector module aimed at a different region of the sky. Each detector module may, for example, have a thermopile and a photometer or photosensor element. Generally, the detector modules are aimed at different regions of the sky at different distances from the building at a certain reference altitude. In one configuration, the cloud detector includes a single detector module and a mechanism for moving the detector module to scan over multiple regions of the sky. In one configuration, a cloud detector includes a first near detector module aimed at a region of the sky close to the building and a second far detector module aimed at a region of the sky far from the building. By viewing different regions of sky at various distances away from the building, the cloud detector can detect characteristics of the clouds at different distances from the building over time and can determine changes in these characteristics based on these distances. In certain cases, a cloud detector can forecast changes in received energy due to changes in cloud cover without needing to map the clouds specifically. In other cases, the cloud detector may be configured to map a portion of the sky.

In certain aspects, the cloud detector includes multiple detector modules aimed at different regions in the sky. Each region is at a different distance away from the building based on a certain reference altitude. Each module can then measure characteristics of the clouds at different distances away from the building at various sampling times. Based on these measurements, the cloud detector can forecast changes in received energy due to changes in cloud cover characteristics over time. In one example, a measured level of intensity of IR at a given time above a certain threshold value may indicate the presence of cloud cover in that region of sky. Using measurements taken at multiple sample times, the cloud detector can determine how intensity levels are changing in the sky relative to different distances from the building. The cloud detector can then use these changes in intensity to determine changes in received energy and changes in cloud cover over time. That is, the direction and speed of the clouds can be determined using the intensity measurements taken over time and based on the distances between the targeted regions of the sky. The cloud detector can use these measured changes in cloud cover to forecast changes in cloud cover at the building. This data can be used, e.g., by a smart window switching algorithm to begin switching glass prior to the particular weather pattern reaching the building with the smart windows.

Configuration 1—Near and Far Detector Modules

In certain embodiments, a cloud detector includes a first near detector module aimed at a first region of the sky at a first distance close to the building and a second far detector module aimed at a second region of the sky at a second distance farther from the building than the first distance. Although not so limiting, certain examples denote the first distance as "1×" and the second distance as "N×" i.e. a multiple of the first distance. N can be an integer multiplier 2, 3, 4, 5, 6, etc. or a real multiplier, for example, N can be a real value between 1 and 10. In some cases, the first distance may be associated with a control operation of the building systems. For example, the first distance may be based on the transition time of an optically switchable window (e.g., electrochromic window). The first and second distances may be based on a certain reference altitude such as, for example, a typical altitude of cloud cover in the region near the building.

FIGS. 1A, 1B, 1C, and 1D illustrate a building 20 with a cloud detector 100 having a first near detector module 110 and a second far detector module 120 directed at different areas of the sky at a first distance $x_1$ and a second distance $x_2$ respectively from the building 20, according to embodiments. The first near detector module 110 includes a tube 111 with an opening end 112 and a back end 113 opposite its opening end 112. The first near detector module 110 also includes sensing element(s) 114 (e.g., cloud sensing element such as a thermopile or a photometer element such as photodiode) enclosed within the tube 111 and located between the opening end 112 and the back end 113. Based on the distance of the sensing element(s) 114 from the back end 113, the first near detector module 110 has a first field of view 119 of the sky at a reference altitude. The second far detector module 120 includes a tube 121 with an opening end 122 and a back end 123 opposite its opening end 122. The second far detector module 120 also includes sensing element(s) 124 (e.g., cloud sensing element such as a thermopile or a photometer element such as photodiode) enclosed within the tube 121 and located at its back end 113. Based on the distance of the sensing element(s) 124 at the back end 123 of the tube, the second far detector module 130 has a second field of view 129 of a different region of the sky than the first near detector module 110 at the same reference altitude. The difference Δ between the first distance $x_1$ and the second distance $x_2$ (e.g., 3×$x_1$, 4×$x_1$, 5×$x_1$, etc.) is the time/distance delay between readings taken by the detector modules 110 and 120.

The sensing elements 114 in the first near detector module 110 are closer to the tube opening end 112 than the sensing elements 124 in the second detector module 120. Thus, the angle of acceptance of the sensing elements 114 in the first detector module 110 is larger than the angle of acceptance of the sensing elements 124 in the second detector module 120. As shown, each of the detector modules 110 and 120 is directed to a different area of the sky. The first near detector module 110 corresponds to a first distance of $x_1$ away from an edge of the building based on a certain altitude that is at the clouds. The second detector module 120 is at a second distance $x_2$, for example, 4×$x_1$, 3×$x_1$, etc., from an edge of the building based on the altitude at the clouds. That is, the near detector module 110 is aimed at the bottom of the cloud cover at a distance of $x_1$ from the building and the far detector module 120 is aimed at the bottom of cloud cover at a distance of $x_2$ from the building.

FIGS. 1A, 1B, 1C, and 1D are schematic diagraphs of four different cloud scenarios at different times at the building 20 with a cloud detector 100, according to embodiments. In these scenarios, the cloud conditions 31, 32, 33, and 34 are moving towards the building 20 from left to right as denoted by a large arrow.

In FIG. 1A, the weather condition of the entire sky near and around the building 20 is overcast. As shown, the clouds 31 are over the regions of the sky within both fields of view 119 and 129 covered by the first and second detector modules 110 and 120 respectively. In this case, both the first near detector module 110 and the second far detector module 120 will detect cloud cover in both regions of the sky at this time.

Figure 1B:
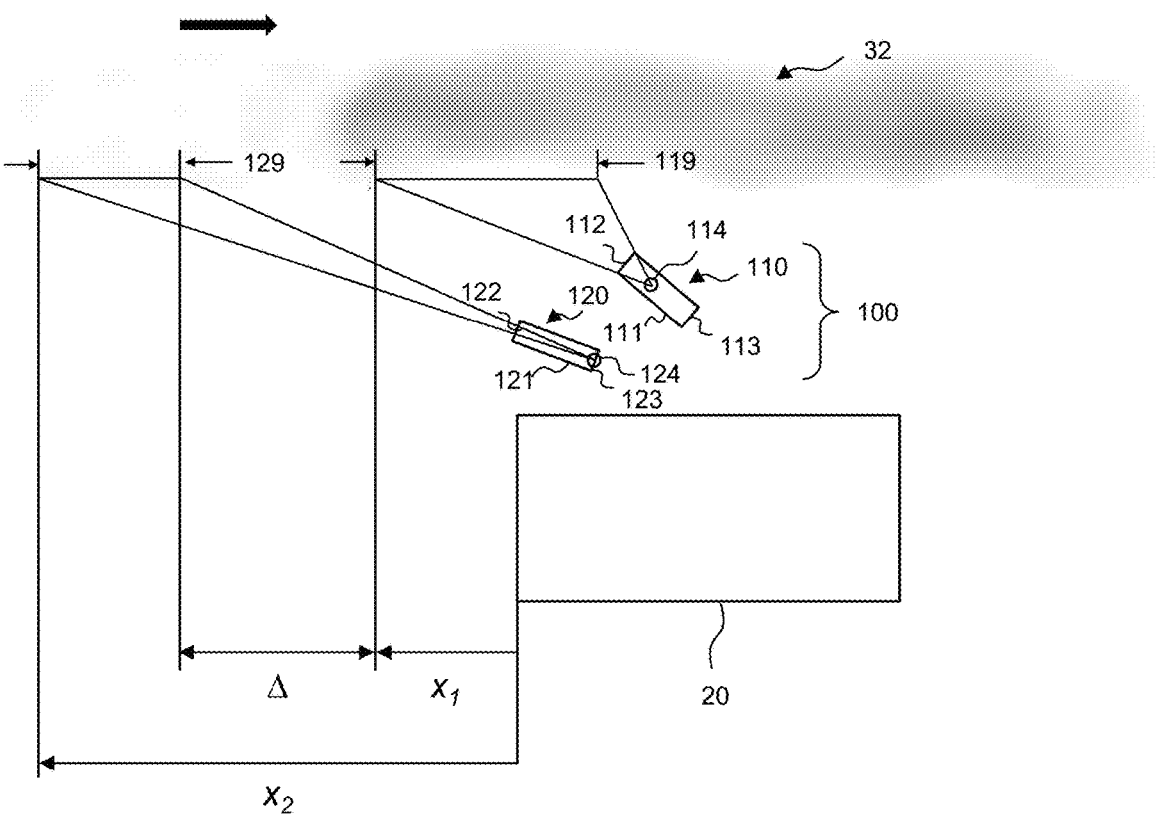

In FIG. 1B, the weather condition is cloudy over and near the building 20 but with impending clearing. As shown, the clouds 32 are over the region of the sky within the first field of view 119 of the first near detector module 110 and not over the region of the sky within the second field of view 129 of the second far detector module 120. In this example, the first near detector module 110 will detect cloud cover in the region of the sky at distance $x_1$ from the building 20 and the second far detector module 120 will detect no cloud cover in the region of the sky at a distance $x_2$ from the building 20.

Figure 1C:
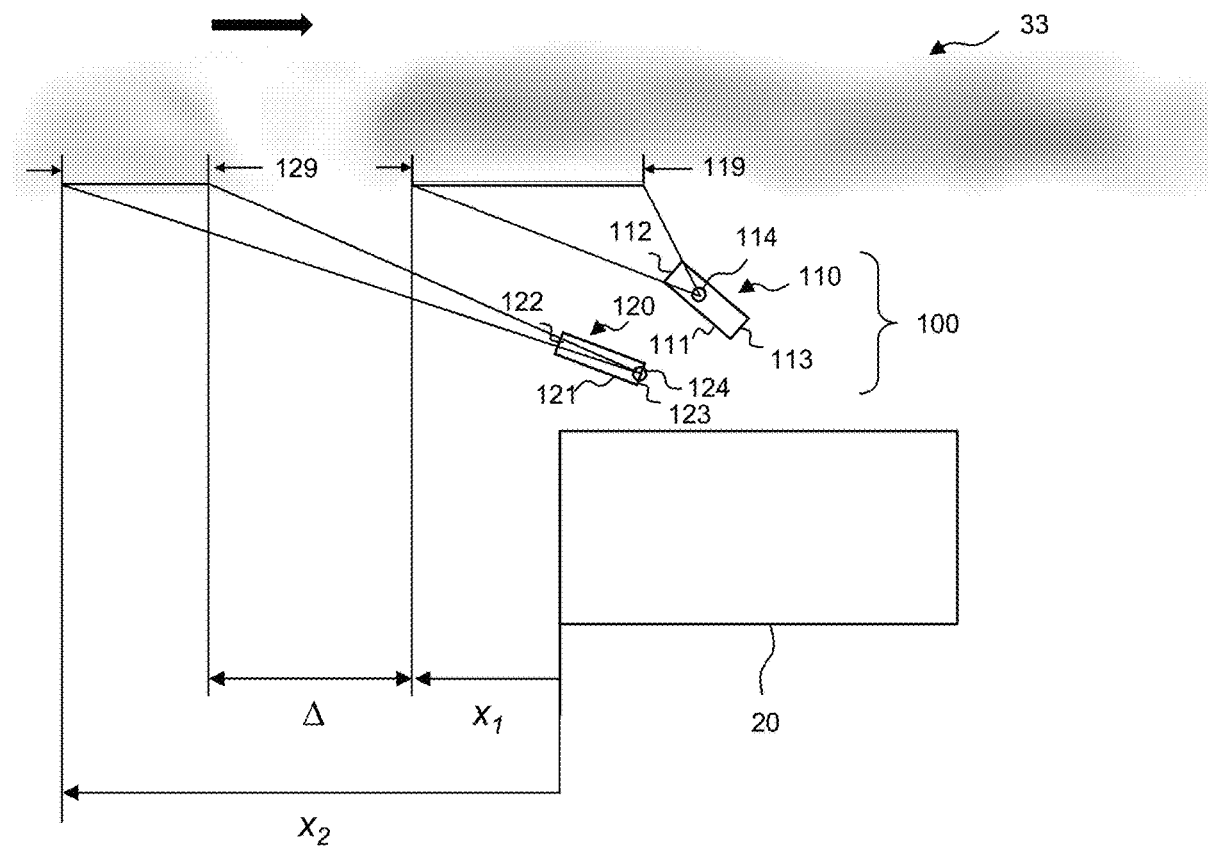

In FIG. 1C, the weather condition of the sky near the building 20 is intermittent cloudy conditions between cloud cover and sunshine. As shown, the clouds 33 are over the region of the sky within the first field of view 119 of the first near detector module 110 and also over the region of the sky within the second field of view 129 of the second far detector module 120. The clouds 33 are not, however, in the sky between these two regions. In this example, the first near detector module 110 will detect cloud cover in the region of the sky at distance $x_1$ from the building 20 and the second far detector module 110 will detect cloud cover in the region of the sky at distance $x_2$ from the building 20. Although neither detector module 110 or 120 detects the lack of cloud cover between these regions of the sky, changing the building control based on this brief sunshine between intermittent clouds would not be efficient and/or could be distracting to an occupant. That is, by the time the control operation was complete, the cloud shown farthest away from the building would have arrived at the building 20 and the control would need to be reverted to the previous control position.

Figure 1D:
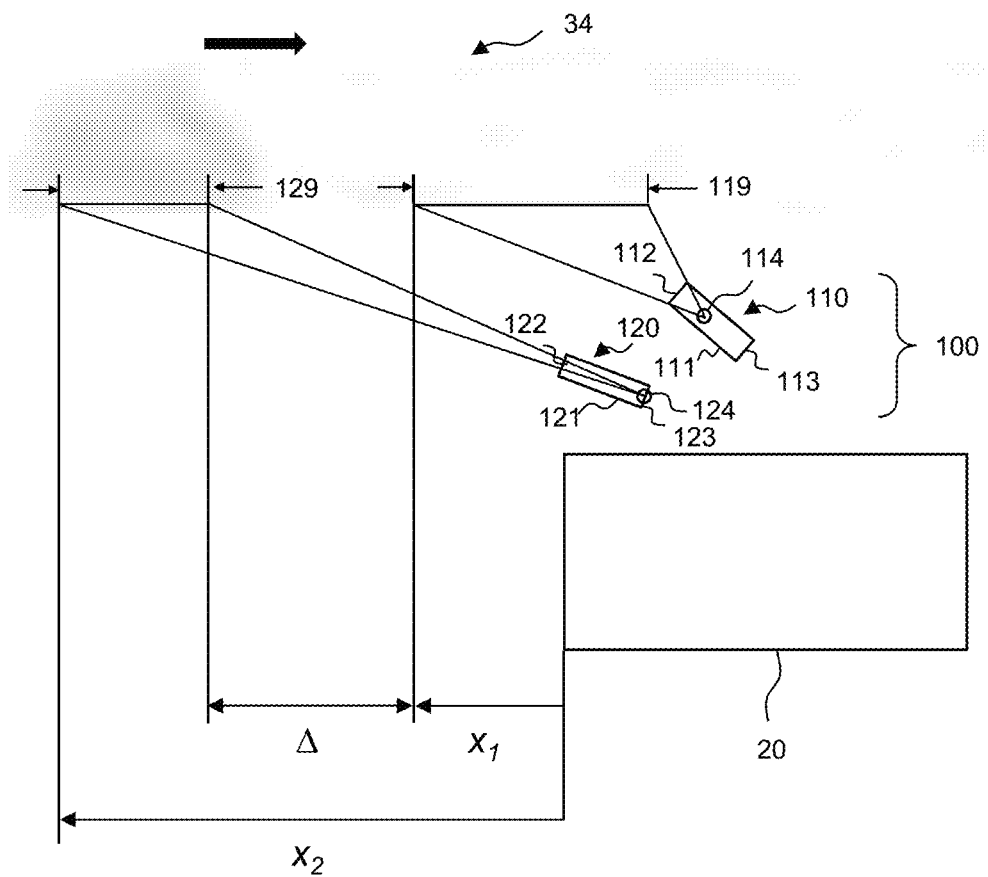

In FIG. 1D, the weather condition near the building 20 is of an impending cloudy condition. As shown, the clouds 34 are not over the region of the sky within the first field of view 119 of the first near detector module 110. The clouds 34 are shown over the region of the sky within the second field of view 129 of the second far detector module 120. In this example, the first near detector module 110 will detect no cloud cover (i.e. clear sky) in the region of the sky at distance $x_1$ from the building 20 and the second far detector module 120 will detect cloud cover in the region of the sky at distance $x_2$ from the building 20.

In certain embodiments, cloud detector measurements from near and far detector modules (e.g., those shown in FIGS. 1A, 1B, 1C, and 1D) can be used as input to building control systems. For example, the cloud detector measurements from near and far modules can be used as input into control logic for optically switchable windows to make tinting decisions such as, for example, change tint state (increase, decrease, clear) or not change tint state. For example, the near detector module may be aimed at a region of the sky that is at first distance $x_1$ equal to a "1×" distance away from the building. In this example, the distance of "1×" is associated with the amount of time it would take an average cloud detected at that distance to reach the building 20. The first detector module can be aimed to have a distance of "1×" associated with the amount of time it will take to transition a particular optically switchable window (e.g., average size window, largest window, etc.) to another optical state such as a different tint level. That is, the near detector module is aimed to detect an average cloud at a time that it would take to transition a window by the time the average cloud reached the building. In this example, the far detector module is aimed at the sky at a second distance $x_2$ of "N×"

(e.g., $3 \times x_1$, $4 \times x_1$, and $5 \times x_1$) distance away from the building. As an example, a "4×" distance for the second detector module may be selected because tint state would only be changed if the cloud detector determines that cloud cover or lack of cloud cover will be over the building for the amount of time that it would take to go from one tint state to another tint state.

In many aspects, the cloud detector detects clouds and measures solar irradiance. In some cases, the cloud detector may determine whether the measured solar irradiance levels are above a threshold level.

In some examples, the cloud detector measurements are used as input to control logic for controlling tint states of one or more optically switchable windows. In some examples, the cloud detector may determine whether the measured solar irradiance levels are above a minimum threshold level to determine whether to increase tint. If there are no clouds and the solar irradiance is above the minimum threshold level, the window control logic may decide to increase tint. If the cloud detector detects a cloud and the measures a solar intensity below the minimum threshold level, the window control logic may decide to decrease tint level (e.g., clear) the windows. In one example, the tinting decisions based on the first detector module will hold unless the second detector module looking at the sky a time/distance of a multiple of the transition time away from the building senses a cloud in that region. If both the first near and second far detector modules sense clouds, then the tinting decision may be to decrease tint (e.g., clear) the optically switchable window.

For example, window control logic may determine tinting decisions for optically switchable windows (e.g., electrochromic windows) based on the cloud detector readings taken at the four different cloud scenarios shown in FIGS. 1A, 1B, 1C, and 1D. Although this example is described with reference to measurements of intensity levels of radiation, other detectable characteristics of clouds may be used such as temperature in other examples.

With reference to the cloud scenario of entirely overcast sky shown in FIG. 1A, both the first near detector module 110 and second far detector module 120 measure low intensity levels lower than the minimum threshold level indicating the presence of cloud cover at both the second far distance $x_2$ and at the first close distance $x_1$ from the building 20. In this example, the first distance $x_1$ is associated with the transition time of an average optically switchable window at the building 20 and the second distance $x_2$ is associated with 4 times (4×) the transition time. In this scenario, the window control logic receives an indication from the cloud detector 100 that there is cloud cover at both the second far distance $x_2$ (4×) and at the first close distance $x_1$ (1×) i.e. that the entire sky is overcast. In response, the window control logic would issue a "clear command" since the entire sky is overcast. A clear command will transition the window to clear if not already clear and will not change tint level if already clear.

With reference to the cloud scenario of overcast sky with impending clearing shown in FIG. 1B, the first near detector module 110 would measure intensity levels below a minimum threshold level indicating the presence of cloud cover at the first close distance $x_1$ from the building 20 (in this case 1×) and the second far detector module 120 would measure an intensity level above the minimum threshold level indicating sunny at a second distance $x_2$ (4×). In this cloud scenario, the cloud detector 100 may determine the period of time between when the cloud was detected by the second far detector module 120 and the time it is detected at the first near detector module 110. If that time is shorter than the transition time of the window, than the window control logic chooses to do nothing since there may still be cloud cover during that transition time. If the time is longer, for example, by some multiple, then the window control logic may choose to tint the optically switchable window. In FIG. 1B, the time delay 4 between the near and far detector modules 110 and 120 is 4 times (4×) the transition time of an optically switchable window in the building. Thus, based on this cloud scenario, the window control logic would issue a "Tint" command in anticipation of the clearing of cloud cover in this scenario.

With reference to the cloud scenario of overcast sky with intermittent clouds in FIG. 1C, the first near detector module 110 and second far detector module 120 would measures intensity levels lower than the minimum threshold level. The cloud detector 100 would determines that these low intensity levels indicate cloud cover at both the second far distance $x_2$ (4×) and at the first close distance $x_1$ (1×) distance. In this cloud scenario, the gap between the cloud cover is transient and though there may be a short period where more light enters the building, it does not trigger a tinting event, and the windows remain properly tinted for the intermittent cloud cover. In response, the window control logic issues a "clear command" because sunshine would be too brief.

With reference to the cloud scenario of impending clouds in FIG. 1D, the first near detector module 110 measures an intensity level above a minimum threshold level indicating sunny conditions at a first close distance $x_1$ (1×) and the second far detector module 120 measures an intensity level below the minimum threshold level indicating cloud cover at a second far distance $x_2$ (4×). In this scenario, the window control logic issues a "clear command" at a certain time that will allow for transition of the optically switchable window to the new clear state by the time the impending clouds reach the building 20. The window control logic issues a clear command because of the impending clouds.

Configuration 2—Single Detector Module

In certain aspects, a cloud detector includes a single detecting module that is scanned over a portion of the sky using one or more mechanisms (e.g., motors). In one example, a single detector module with two degrees of freedom is rotated using a motor to scan a portion of the sky. An encoder or other like device can be used to give position feedback that can be used to actively map the sky. At each position of the single detector module, the sensing elements within have a limited field of view and can measure detectable characteristics of the clouds. By scanning this limited field of view to multiple positions with overlapping or separate fields of view, this cloud detector may be able to detect clouds with a high degree of resolution. Although described as scanning over a portion of the sky, it would be understood that the single detecting module may take measurements at incremental movements of the single detector module to different (overlapping or separate) portions of the sky.

In certain aspects, a cloud detector includes a single detector module mounted on a pivot with a counterbalance. A single motor can be used to rotate the single detector module about the pivot to move the field of view of the detector module to different regions over a portion of the sky. The counterbalance is designed to change the angle of the detector module based on the speed of the motor. In this way, a single motor and an encoder can be used to determine a predictive angle of the detector module. An example of such as an embodiment is described with reference to FIGS. 2A and 2B.

Figure 2A:
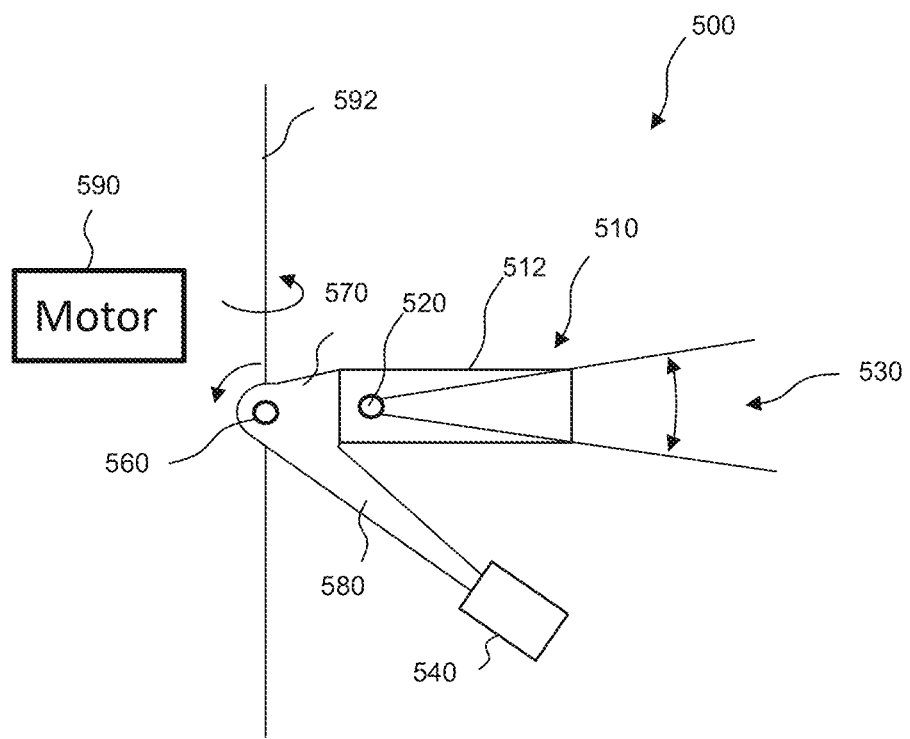
FIGS. 2A and 2B are drawings of a side view of a cloud detector with a single detector module mounted to a two-axis gimbal, according to embodiments.
Figure 2B:
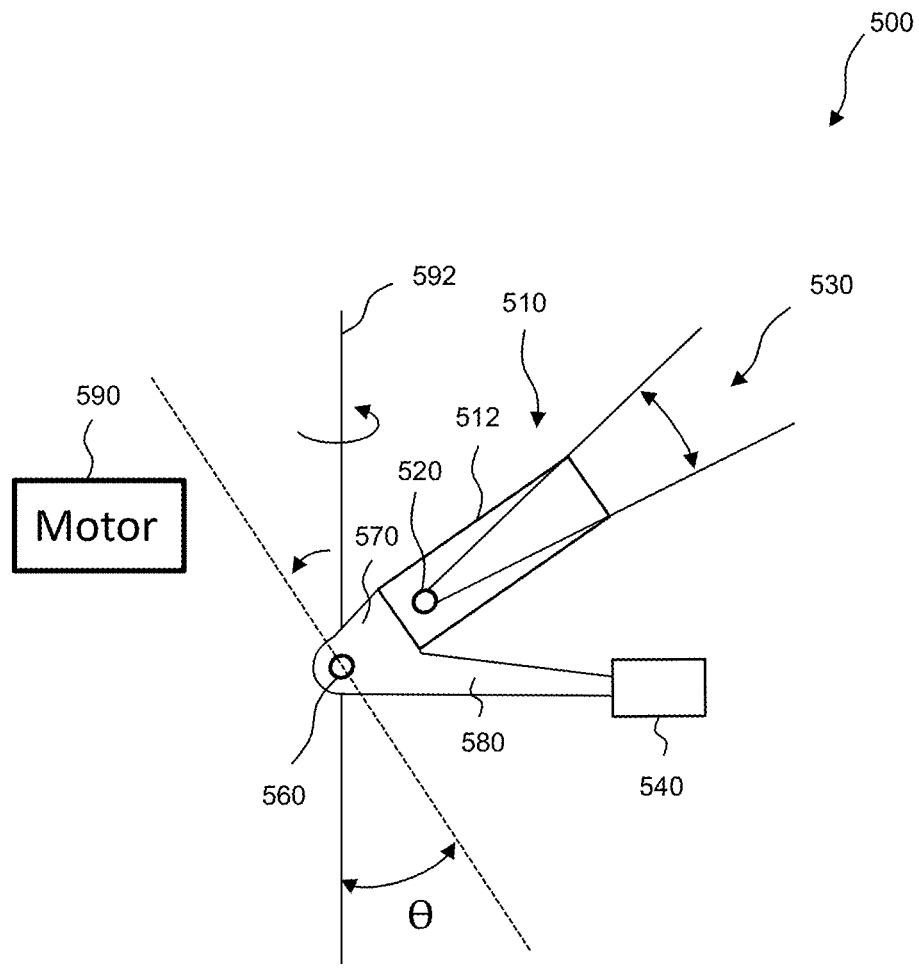

FIGS. 2A and 2B are drawings of a side view of a cloud detector 500 including a single detector module 510 having two degrees of freedom, according to embodiments. The single detector module 510 includes a tube 512 with=sensing element(s) 520 (e.g., temperature sensor such as a thermistor and a thermopile) within the tube 512. The sensing element(s) 520 are centrally located near the back end of the tube 512. The field of view 530 of the sensing element(s) 520 is illustrated.

Detector module 510 is mounted on a two-axis gimbal having a first arm 570 and a second arm 580 attached at a first end to the first end of the first arm 570. The two-axis gimbal is attached to an first axial element that can rotate the two-axis gimbal about a pivot point 560. The single detector module 510 further includes a counterbalance 540 at a distal end of the second arm 580. The base end of the tube 512 having the sensing element(s) 520 is attached to the first arm 570 of the two-axis gimbal. As configured, the detector module 510 can rotate about the first vertical centerline axis 592 and about a second axis through the center of the pivot point 560 and normal to the plane of the side view to enable it to map a nearly complete sphere. In one aspect, the two-axis gimbal may have an encoder on one or both of the rotational axis to give position feedback. In this example, the cloud detector 500 also includes a motor 590 connected (not shown) directly or indirectly to the two-axis gimbal to be able to rotate the detector module 510 around the first axis and/or the second axis. For example, the motor 590 may be connected to another axial element about the first centerline axis and that is attached to the two-axis gimbal. The motor 590 can then rotate this second axial member and/or first axial member to rotate the detector module 510 about the first axis and/or the second axis.

FIG. 2A shows the operation of the cloud detector 500 when the motor 590 is rotating about the centerline axis 592 at a low speed. FIG. 2B shows the operation of the cloud detector 500 when the motor 590 is rotating about the centerline axis 592 at a high speed. At lower speed rotation, the centripetal force acting on the counterbalance 540 moves it outward to the point so that the tube 512 is aimed at about 90 degrees from the centerline axis 592. At high speed rotation, the centripetal force acting on the counterbalance 540 moves it outward to a maximum point so that that the tube 512 is aimed upward by about 135 degrees from the centerline axis 592. By adjusting the rotation speed of the motor 590, the angle θ of the detector module 500 and associated field of view 530 can be adjusted to sweep through different portions of the sky.

Configuration 3—Array of Detector Modules

In certain embodiments, a cloud detector includes multiple detector modules arranged in an array (one dimensional or two dimensional). Each detector module of the array is aimed at a different region of the sky. In this configuration, the cloud detector can measure incoming energy from various directions at each sample time. In some cases, the cloud detector can detect clouds (or lack of clouds i.e. clear sky) based on differences in energy measured by each detector module over time. By looking at the difference in these measurements over time for different modules, a change in cloud cover can be deduced for various locations near or at the building. A light intensity measurement taken at each single sample time can be used to determine the existing light condition.

In certain aspects, a cloud detector that comprises an array of detector modules may include an array of discrete sensing elements (e.g., thermistors, photodiodes and/or thermopiles). For example, the cloud detector may include an array of discrete sensing elements (sensor array) and an array of tubes. Each tube encloses one or more discrete sensing elements (e.g., pixels) of the sensor array located at the back end of the tubes. In one case, the cloud detector may be formed by locating the array of tubes on top of the detector array. In this example, the cloud detector is in the form of an array of detector modules where each detector module includes a tube (partition) that encloses one or more discrete sensing elements within each tube. In some cases, each tube may further comprise additional sensing elements, e.g., IR sensors, located proximal the wall of the tube.

In embodiments with an array of detector modules, the cloud detector can detect clouds or the direction and movement of clouds based on changes to measured energy received at a portion of the sensor array from a given direction. If a sensor area closer to the center of the sensor array begins to read a change, it may be inferred that clouds are approaching (or moving away). In this way, the cloud detector can predict cloudy conditions well in advance. By using data from a cloud detector, building control algorithms can anticipate cloud conditions and send control commands well in advance of the conditions so that the building systems are in appropriate state by or before the time the cloud cover reaches the building. If the transition time of a building system is lengthy, this advance notice of a cloudy condition can be used to start the transition well in advance so that the system has completed transition by the time the new state is required. For example, a window control algorithm may use the cloud detector data to predict cloudy conditions and determine the need to tint or clear the optically switchable window in advance of when it is required.

In embodiments with an array of detector modules, the entire or portion of the cloud detector may be enclosed by a transparent covering/shield (e.g., hemispherical or conical protective covering). This transparent covering may be designed to protect the inside components of the detector modules from debris while allowing radiation to pass to the sensing elements.

In one example, a circular array of tubes (e.g., cylinders or cones) may be placed over a sensor array such as a CMOS sensor array, a CCD sensor array, or a specially scribed solar panel. The circular array of tubes may be placed over the sensor array to be able to measure changes in incoming energy over time in various directions. In this case, the tubes are partitions. With this method, it would be possible to detect clouds (or lack of clouds) with a reduction or increase in measured energy from a direction. If a sensor area closer to the center of the sensor begins to read a change, it could be inferred that clouds are approaching (or moving away), which allows for predicting cloud conditions in advance and allowing for advance transitioning of the building control system to the new state.

In embodiments with an array of detector modules e, the cloud detector may have an alignment feature (e.g., indicator) that can be positioned in alignment with a particular direction such as North, South, East or West, or in the direction of a particular facade of a building. If the alignment feature is designed to be aligned with a specific façade, the directions of the detector modules are aligned to associate a change measured by the field of view of a given detector module partition to the specific facade of the building. With this design, the, the cloud detector can determine the presence of clouds (or lack of clouds) based on a measured reduction or increase of energy/light from the direction of the given detector module partition. If an area closer to the center of the cloud detector begins to measure this change, it could be inferred that clouds are approaching (or moving away), as the change is occurring overhead as opposed to in the distance. Thus, this cloud detector may be able to predict the need to change the state of a building system, well before it is actually required.

Figure 3:
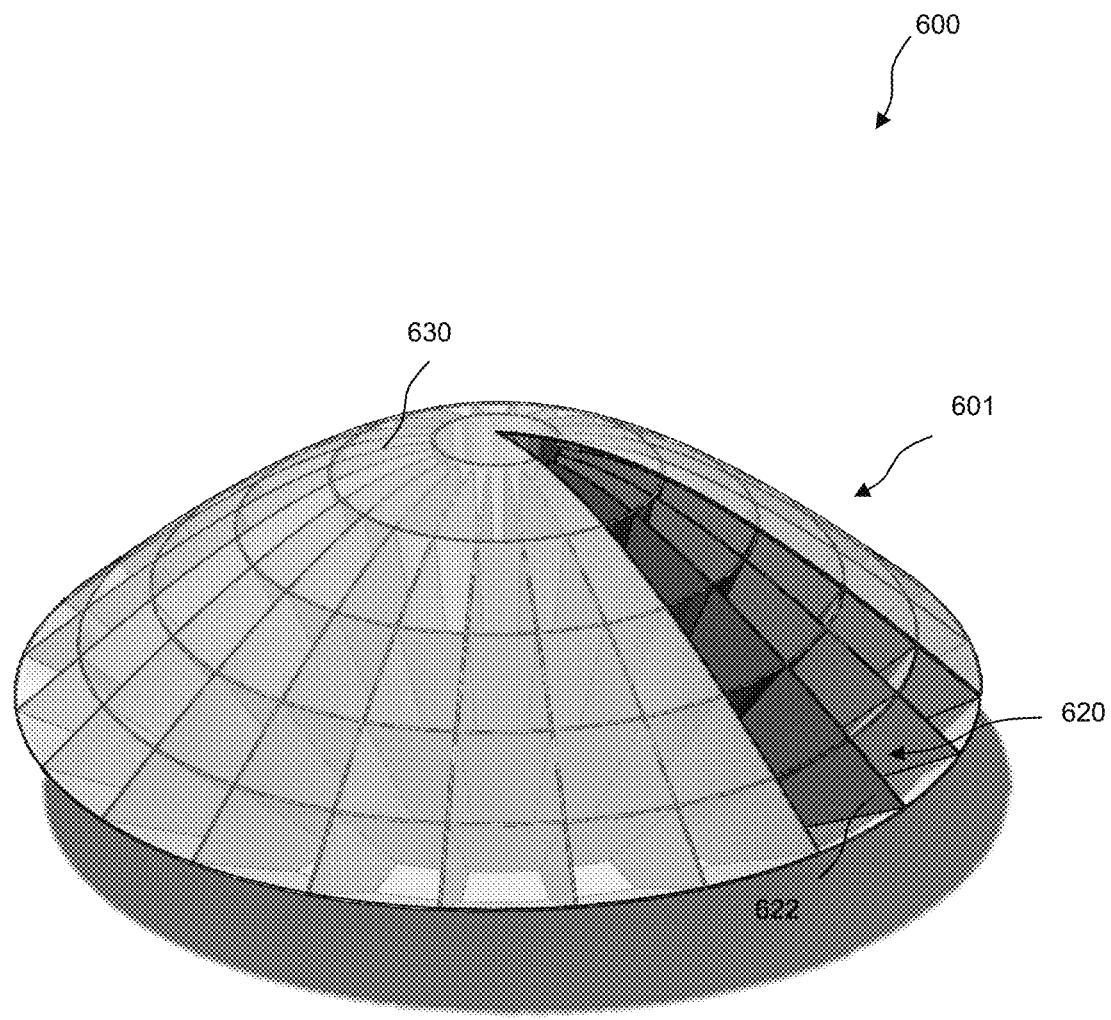
FIG. 3 is perspective view of a cloud detector including a circular honeycomb-configured array of detector modules within a hemispherical enclosure, according to an embodiment.

FIG. 3 is perspective view of a cloud detector 600 in the form of a circular honeycomb-configured array of detector modules 620 within a hemispherical enclosure, according to an embodiment. Each detector module 620 includes a tube 622 and one or more sensing elements (for simplicity, sensing components in each tube are not shown). The circular honeycomb-configured array 601 has a circumferential dimension of 24 and radial dimension of 4, although other dimensions can be used. In this illustrated example, each of the tubes 622 in the honeycomb array 601 is aimed at different region of the sky. There may be more than one type of sensing element in one or more of the tubes 622. In one case, the sensing elements of the cloud detector 600 may be in the form of a CMOS/CCD sensor array or a specifically scribed solar cell. In this illustrated example, the cloud detector 600 can predict cloud travel direction by analyzing changes in energy gathered in each detector module section 620 over time. In one case, the tubes 622 may be designed so that the overall shape matches the solar azimuth angle. In one case, each partition/tube 622 would be sized such that the same energy level is measured as close to equally as possible to other partitions/tubes 622.

In FIG. 3, a shield 630 (e.g., glass or other transparent material covering) is provided over the entire face of the cloud detector 600. This shield 630 may protect the sensing elements from debris and/or moisture intrusion. The illustration shows a cutaway section of the shield 630 to show inside of a section of the cloud detector 600.

Using a cloud detector with an array of detector modules (e.g., the cloud detector 600 of FIG. 3), cloud location may be determined and/or predicted based on the relative light/energy levels measured in each detector module partition. As the clouds move relative to the cloud detector, their trajectory and location can be determined. A sudden light level reading change by sensing elements in a partition proximal the outer perimeter of the cloud detector could indicate that a cloud is in the distance. Whereas a light level reading change by sensing elements in a partition proximal the center of the light detector, could indicate clouds are overhead. Using these determinations paired with predictions from a solar calculator, the cloud detector may be able to determine if the determined cloud/obstruction (or lack thereof) would alter the irradiance at a given facade.

In one embodiment, a cloud detector may include an array of tubes placed over a sensor array chip, each tube limiting the field of view to a small section of the chip. The tubes cloud map regions of the sky to the specific sensors looking for both clouds and changing light intensity. In one example, a photodiode and a thermopile are assigned to each tube.

In one embodiment, a cloud detector includes a sensor chip (e.g., CMOS/CCD) with a lens array. Each lens is configured to focus radiation to specific set of one or more sensor elements such as a portion of the sensor chip and/or a thermopile. These lenses could limit the field of view and map regions of the sky to specific sensor elements looking for both clouds and changing light intensity.

Section III—Cloud Detection Sensing Elements

Both clouds and water vapor absorb and re-emit radiation in discrete bands across the infrared (IR) spectrum. Since clouds are warmer than clear sky and water vapor, devices that measure IR can be used to detect a cloud. For example, infrared radiometers, including those configured as IR thermometers, can detect clouds, which are warmer than the clear sky, and water vapor. In one embodiment, a cloud detector may have an IR sensing element that measures intensity of IR with wavelengths above 5 µm. The presence of clouds produces an enhanced IR signal (which corresponds to an approximate black body spectrum at about ground temperature) above that from the clear sky. There is also an effect of atmospheric humidity which can produce enhanced signals particularly at low elevations.

In certain aspects, a cloud detector may have an IR sensing element that measures intensity of infrared radiation with wavelengths in a specific range, for example, between 8 µm and 14 µm, or in another example, above 5 µm. In operation, the cloud detector may detect a cloud when it determines that the measured intensity level of infrared radiation with the specific range of wavelengths is above a threshold value. It has been shown that measured levels of Infrared radiation with wavelengths above 5 µm (in particular in a range between 8 µm and 14 µm) are sensitive to the presence of clouds as demonstrated in Sloan, Shaw and Williams (1955), which is hereby incorporated by reference for the purpose of providing this range of wavelengths associated with the presence of clouds. The use of infrared radiation detecting devices to detect clouds is described in Sloan, Shaw and Williams (1955), Werner (1973), Morris and Long (2006), Idso (1982), Maghrabi and Clay (2010), Thompson (2005), and Maghrabi et al., (2009), and Clay et all, "A Cloud Monitoring System for Remote Sites," Publ. Astron. Soc. Aust., Vol. 15, (1998), pp. 332-5; which are hereby incorporated by reference for the purpose of describing this use.

In certain embodiments, cloud detectors uses infrared sensors to measure infrared radiation to detect a cloud cover. These infrared sensors can be used to either monitor the entire sky or monitor a limited field of view of cloud cover. Some examples of types of infrared sensors that can be used include an infrared thermometer (e.g., a thermopile), infrared radiometer, infrared pyrgeometer, infrared pyrometer, etc.

In certain embodiments, a cloud detector may use an infrared thermometer to detect clouds. In one example, the infrared thermometer is a thermistor bolometer responsive to infrared radiation in the wavelength range of 9.5 µm to 11.5 µm. In certain embodiments, the cloud detector may have a sensing element that is an infrared thermometer in the form of a thermopile. In one embodiment, the thermopile is configured to respond to infrared radiation in the wavelength range of 8 µm to 14 µm. In one embodiment, the thermopile is configured to respond to infrared radiation in the wavelength range of 10.5 µm to 12.5 µm. In one embodiment, the thermopile is configured to respond to infrared radiation in the wavelength range of 6.6 µm to 20 µm.

In certain embodiments, a cloud detector uses an infrared thermometer (e.g., thermopile) to detect a cloud and/or a photometer for thresholding. The infrared thermometer can function as an infrared radiometer to both detect the presence of clouds and provide a means for estimating precipitable water (PW) with an rms difference with PW given by a sun photometer of as little as 2.68 mm.

Figure 4A:
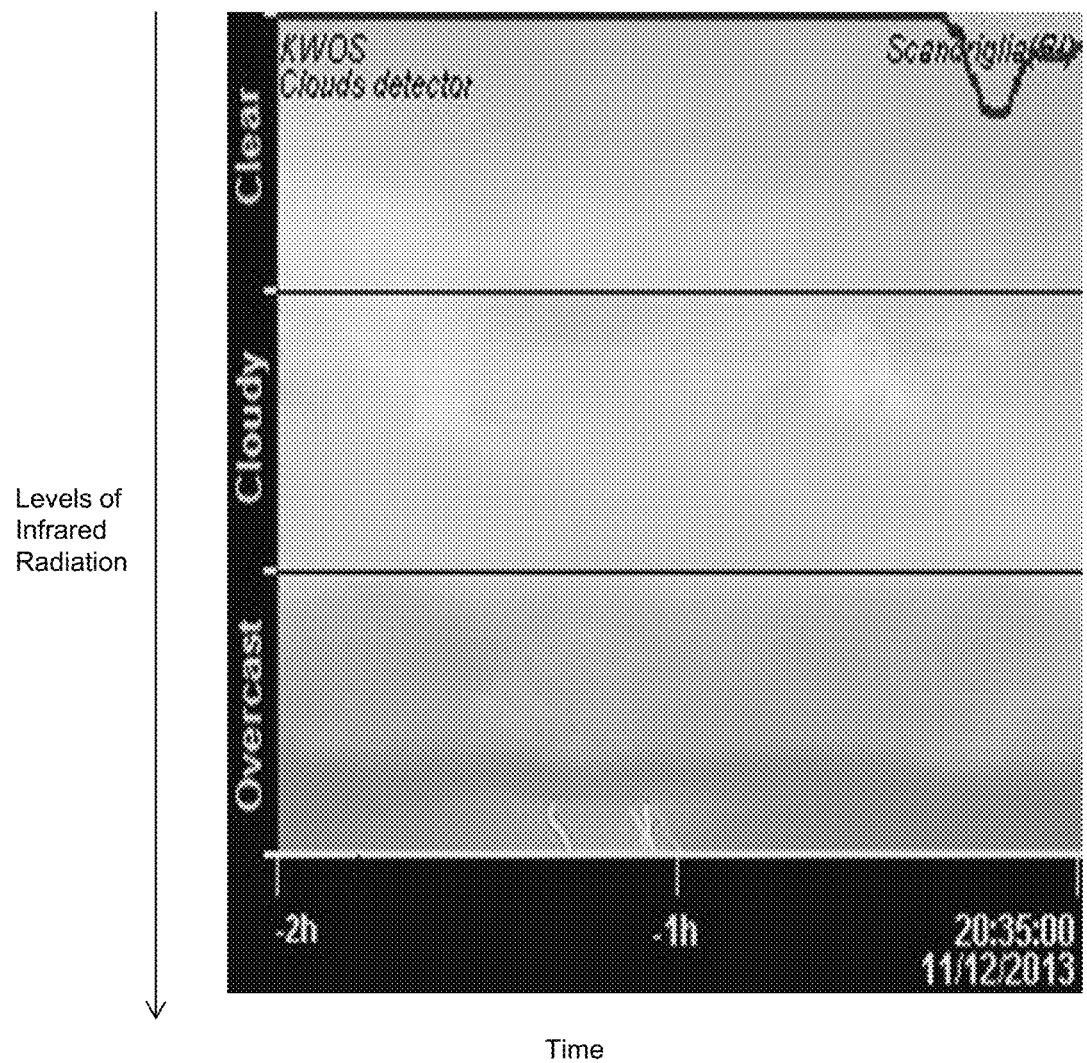
FIGS. 4A and 4B is a graph illustrating the functionality of an infrared sensor as a sensing element in a cloud detector, according to embodiments.
Figure 4B:
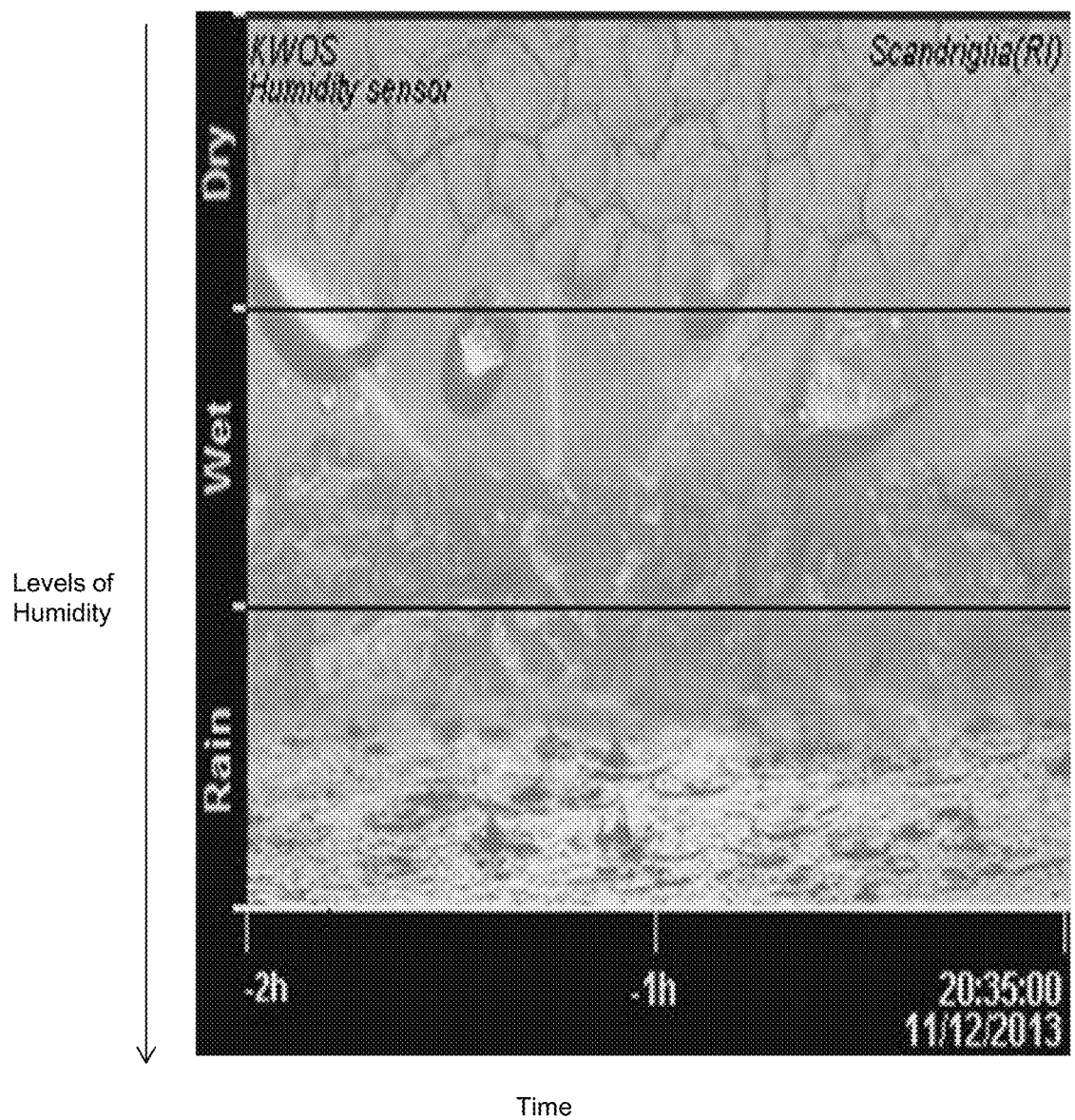

FIGS. 4A and 4B are graphs illustrating how an infrared sensor may function as a cloud detector or as a humidity sensor to detect rain, according to embodiments. The cloud detector used with reference to the illustration in FIG. 4A includes an infrared sensor for detecting clouds. As shown, the overcast conditions are determined based on high measured levels of infrared radiation with wavelengths in a specific range and cloudy conditions are determined based on lower measured levels of infrared radiation. The cloud detector used with reference to the illustration in FIG. 4B includes a humidity sensor to detect rain. As shown, rainy conditions are determined based on high measured levels of humidity and wet conditions are determined based on lower measured levels of humidity.

Figure 5:
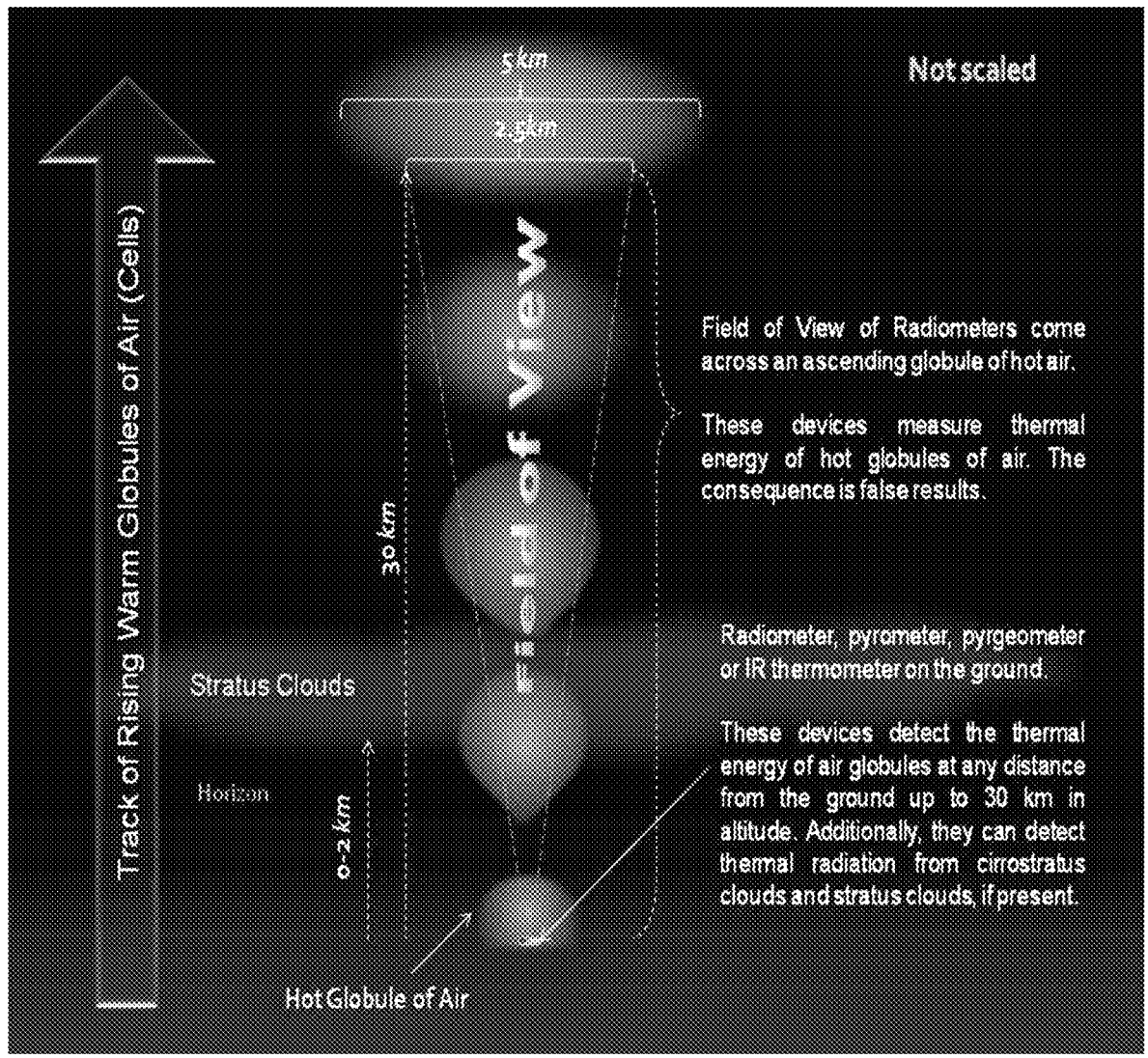
FIG. 5 is a diagram illustrating radiometers, pyrometers, pyrgeometers, or infrared thermometers as sensing elements in cloud detectors to measure thermal radiation from clouds, according to embodiments.

FIG. 5 is a diagram illustrating that radiometers, pyrometers, pyrgeometers, or infrared thermometers can be used as sensing elements in cloud detectors to measure thermal radiation from clouds, according to embodiments. As shown, the measurements of thermal radiation from these sensing elements can be used to detect cloud cover in cloud detectors of embodiments.

Figure 6:
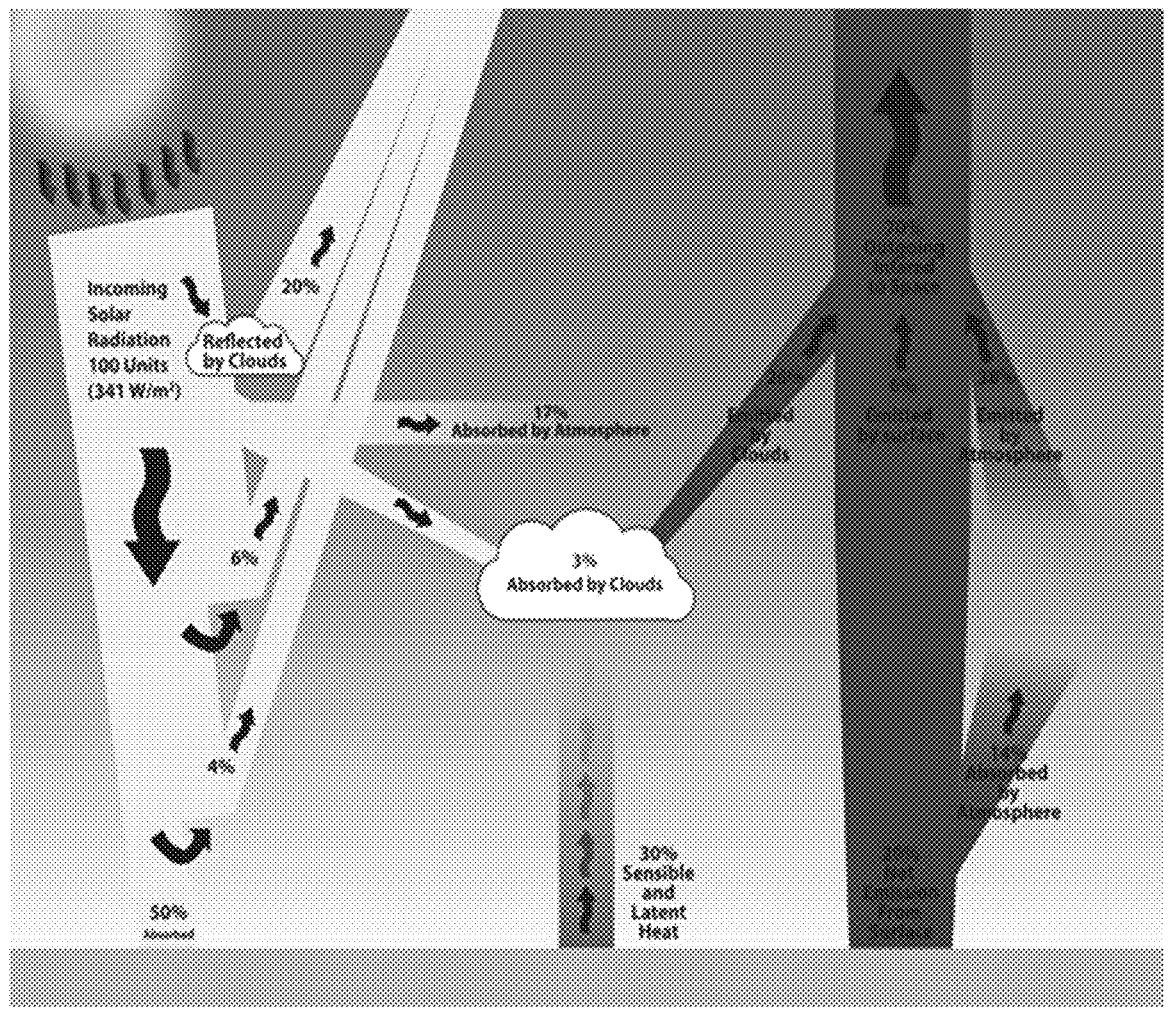
FIG. 6 is a diagram showing the cycles of absorption by clouds of visible light from the sun and infrared radiation from the ground, and then the re-emission of this radiation.

FIG. 6 is a diagram showing the cycles of absorption by clouds of visible light from the sun and infrared radiation from the ground, and then the re-emission of this radiation. A discussion of the details of the wavelengths of radiation from the ground and methods of measuring them using terrestrial based systems can be found at www.kippzonen.com, more specifically at http://www.kippzonen.com/Knowledge-Center/Theoretical-info/Solar-Radiation, which is incorporated by reference for this description.

Figure 7:
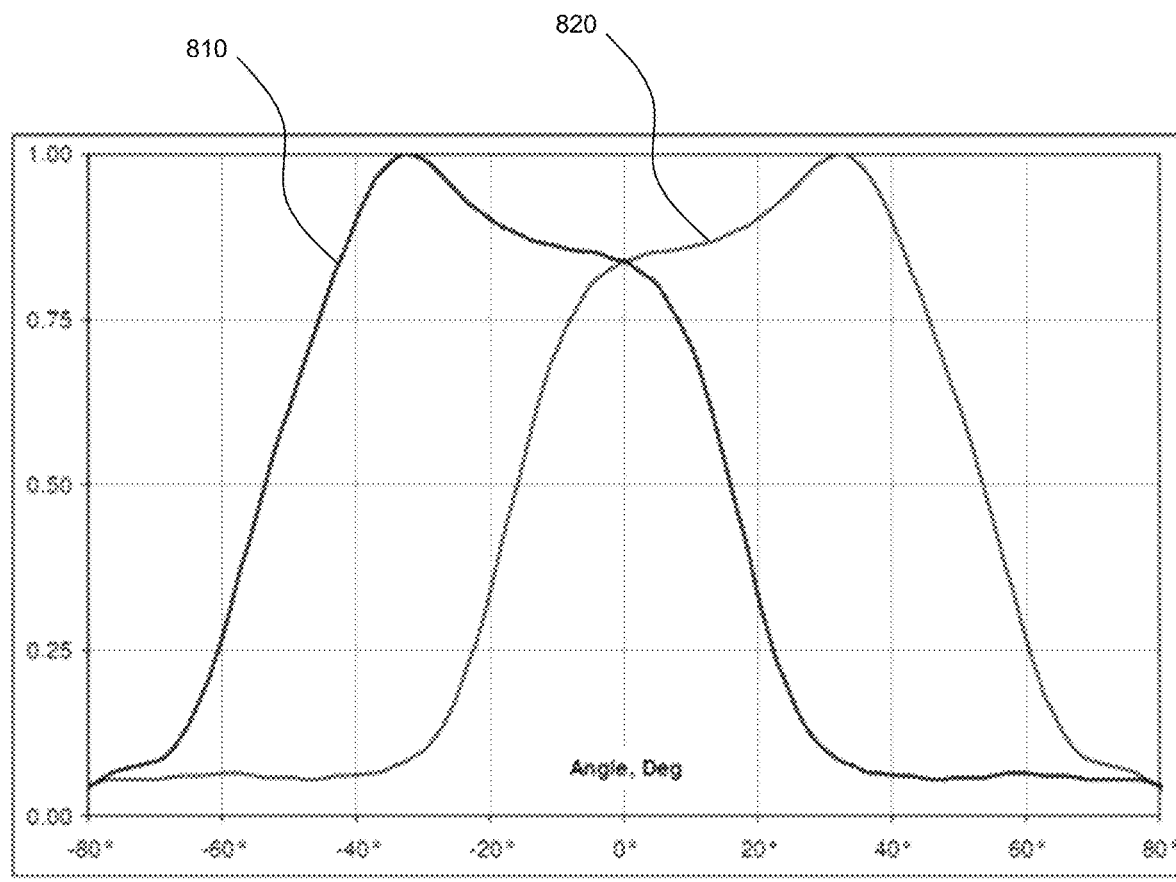
FIG. 7 is a graph of results from using a cloud detector including a thermopile infrared sensor, according to embodiments.

FIG. 7 is a graph of results from using a cloud detector including a thermopile infrared sensor, according to embodiments. The thermopile IR sensor was directed to Zenith. As shown, the thermopile infrared sensor integrates radiation over a field of view of about 120° of the sky. Clear view to the sky may be important because terrestrial objects can cause parasite infrared radiation. In fact two zones are measured by the thermopile sensor each with approximately 90° field of view. FIG. 7 shows two curves associated with the two zones.

A cloud detector of embodiments that uses an infrared thermometer may have one or more technical advantages. One advantage is that commercially-available infrared thermometers are typically inexpensive. Another advantage is that infrared thermometers do not require cooling systems and customized electronics, and may be in compact form such as in a battery-powered, handheld instrument. Another advantage of using an infrared thermometer is that it does not require separate measuring of ambient temperature since infrared thermometers incorporate temperature compensation circuitry that corrects for changes in the ambient temperature. This is usually implemented by employing a 2-element detector, one element being shielded from the source of infrared radiation being monitored and the other being exposed to the source of infrared radiation.

Some examples of infrared sensing elements are elements of a CCD, CMOS, spectroradiometer, thermopile, pyronometer etc.

Section IV Methods of Determining Cloud Status

In certain embodiments, a cloud detector includes one or more detector modules that measure detectable characteristics of clouds from different fields of view. In some cases, the cloud detector may include multiple detector modules, each aimed at a different region of the sky. In other cases, a single detector module may be scanned over different regions of the sky over time. By viewing different regions of the sky, the cloud detector can measure detectable characteristics of clouds at different distances away from the building.

In one embodiment, the cloud detector may determine expected irradiance levels for clear skies at different distances away from the building using predictions from a solar calculator or open-source program Radiance. The cloud detector may then measure the actual irradiance levels at the different distances. By comparing these values, the cloud detector can detect cloud cover at various distances from the building. Measurements taken by the cloud detector can also be used to map the sky. The determinations by the cloud detector may be used to determine a building control system decision. For example, the data determined from each detector module may be used to determine whether to tint or not tint a particular optically switchable window or zone of windows in a building.

By using output from the cloud detector as input to control building systems, the control of these building systems can be based on actual radiation (e.g., reflective radiation such as from reflections from a nearby building) and changing environments. In one embodiment, the logic for controlling a building system may include input from the cloud detector and shadow mapping using a range finder to map nearby obstructions, like buildings, trees, mountains etc.

In certain embodiments, measurements from two detector modules can be used as input to make decisions for one or more building systems. For example, measurements from two detector modules can be used to make tinting decisions such as change tint state (increase, decrease, clear) or do not change tint state in an optically switchable window. The first near detector module views the sky closest to the building. The second far detector module views the sky further from the building. The first near detector may, for example, look at a region of the sky that is at a distance away from the building so that the average cloud that is detected is approximately a single transition time out based on tint time for a reference window (e.g., average window or largest window). If the first detector module determined that there are no clouds at that near distance and the solar intensity is high enough (e.g., greater than a threshold value), it may be determined to tint the windows. If, however, first detector module determined that there is a cloud at that near distance and the solar intensity is low enough (e.g., lower than a threshold value), it may be determined to clear the windows. These control decisions would hold until the second detector module looking at the sky at the far distance (4×, 3×, etc.) away from the building detects a cloud. If both the second detector module and the first detector module detect a cloud then the window would be cleared. The far distance is selected based on the desire to avoid changing tint states if the cloud/lack of cloud will be over the building for the amount of time that it will go from one tint state to another tint state.

With reference to the cloud detector illustrated in FIGS. 1A, 1B, 1C, and 1D, for example, cloud detector measurements from near and far detector modules can be used as input to electrochromic window control logic to make tinting decisions. If both near and far detector modules detect clouds, then the window control logic may choose to change the tint levels accordingly. If the windows are already clear, then no tint change. If the windows are clear, then the control logic would clear the windows. If the second far detector module detects a cloud and the first near detector module does not detect a cloud (i.e., clear sky near the building) and the cloud detector is measuring no change in direction of the clouds, the control logic may decide to hold the current tint level (no tint change). The change in direction of the clouds may be determined by monitoring the cloud movement by measurements taken at multiple sample times. In another scenario, the near detector module may detect a cloud and the far detector module may not detect a cloud. If the period of time between when the cloud was first detected at the far module and when detected at the near module is shorter than the transition time, then the tint level is not changed. If the period of time between when the cloud was first detected at the far module and when detected at the near module is longer by some multiple (e.g., 4×) than the transition time, then the tint level is changed.

By using a specific field of view with different ranges from the building and knowing the sun irradiance in various fields of view from sensor measurements or from predicting values from a solar calculator or open-source irradiance, the data can be used to show that the clouds at various ranges/distances from the building to either map the sky or to have a simple go/no go based on a table that is with respect to each detector and it's corresponding field of view of the sky.

In some embodiments, cloud determinations and intensity measurements from a cloud detector may be used to map a cloud or the sun's reflection on a building. In these cases, the location of the clouds may be mapped to the building and only the windows affected by the clouds or reflection may be tinted accordingly. Instead getting a general location of the clouds, if they are within 30 min of the building and there are also clouds within 1 hour of the building then we would tint, in an hour there are no clouds within 30 minutes of the building then we would clear.

Although many of the embodiments described herein may be described with reference to optically switchable windows, other controllable elements (e.g., mechanical shades, solar array directional trackers) may be used.

Example Flowchart of Method of Cloud Status Determination.

Figure 9:
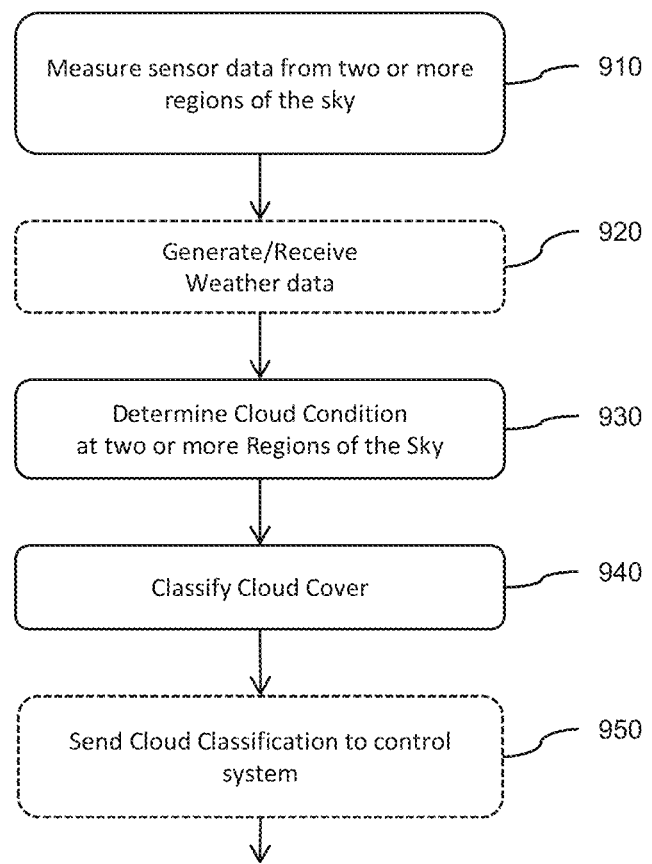
FIG. 9 is a flowchart of a method for determining cloud status, according to embodiments.

FIG. 9 is a flowchart of a method for determining cloud status, according to an embodiment. At operation 910, the method uses a cloud detector system to measure sensor data from two or more regions of the sky. The cloud detector system includes at least one detector module having a tube enclosing the sensors to restrict the field of view of the sensors. Depending on the configuration of the cloud detector system, it may measure sensor data at one or more sample times. For example, a cloud detector system in a configuration having a first near and second far detector module aimed at different regions of the sky at the same time can sample data at a single time. In another example, a cloud detector system with single detector module moved to aim it at two regions of the sky can sample data at two sample times. As another example, a cloud detector system with an array of detector modules may sample data at a single sample time.

Optionally (denoted by dashed line) at operation 920, the cloud detector system may generate weather condition or forecast data or may receive this data from an outside source such as a weather forecast service or a satellite feed.

At operation 930, the cloud detector system determines whether there is cloud cover at each of the two or more regions of the sky. For example, the cloud detector system may determine whether the sensor data (e.g., infrared radiation intensity, visible light intensity, etc.) measures an intensity value above a minimum threshold value. In one aspect, the minimum threshold value is 10 Watts/m$^2$. In another aspect, the minimum threshold value is 50 Watts/m$^2$. In another aspect, the minimum threshold value is 100 Watts/m$^2$. If above the minimum threshold value, the cloud detector system determines there is cloud cover at the region.

At operation 940, the cloud detector system classifies the cloud cover (or lack thereof) based on the sensor data and/or weather condition data. For example, if both regions of the sky are determined to be cloudy in operation 930, then then the cloud detector system may determine a cloud status of overcast conditions. As another example, if the far region determined to be cloudy and the region proximal the building a clear, then the cloud detector system may determine impending cloudy condition. If the region far away is clear and the region proximal the building is cloudy, the cloud detector system may determine impending clear condition. In another example, the cloud detector system may determine a cloud status with a cloud classification and weather condition based on the sensor data and/or weather data using a classification system such as, for example, shown in the chart in FIG. 10.

At optional (denoted by dashed line) operation 950, the cloud detector system sends the cloud classification to a control system. In some cases, the control system may be part of the cloud detector system.

V. Extensions of the Cloud Detector Systems

In one embodiment, the cloud detector system can couple cloud cover output with information from a laser, sonar, or other type of range finder to further map the buildings and resulting shadows to more specifically respond to atmospheric changes. In one embodiment, a cloud detector may be further configured to map the position of the sun and/or the moon. In this case, the data from the cloud detector may be used to replace or used in addition to data from a solar calculator.

Part B—Cloud Cover Characterization

In certain aspects, a cloud detector system can provide real-time determination and/or prediction of cloud cover status, for example, in terms of optical density, size (if any), distance from the building, speed of clouds, and consistency of cloud coverage (e.g., sky half cloudy, completely cloudy, etc.) that characterize the cloud cover. Consistency of cloud cover may be based on coverage density and/or opacity of the clouds.

In certain aspects, the cloud detector system can use data from its sensors and/or satellite images to determine/predict cloud status. The cloud status can be used as input into building control systems or into other control systems. For example, cloud status may be used to determine tint decisions for electrochromic window(s) in a building. In one case, certain values of cloud characteristics may correspond to a certain tinting decision. Although cloud status is described in certain examples herein as related to controlling tint decisions in electrochromic windows, other building control systems may benefit from being controlled by cloud status such as, for example, a mechanical shade system in a building or automated doors on an observatory dome to protect equipment. Also, other control systems may use cloud status data such as a solar panel array control system, etc.

In certain cases, a predicted/determined cloud status may be used as input to logic used to control building systems such as prediction logic that employs a solar calculator and/or other clear sky irradiance prediction logic. For example, a determination of a "mostly cloudy" cloud status cloud be used to override a decision based on a prediction of clear sky from a solar calculator or other clear sky irradiance prediction logic. An example of a system with window control logic that employs a solar calculator is described in in PCT application PCT/US15/29675 titled "CONTROL METHOD FOR TINTABLE WINDOWS," and filed on May 7, 2015, which is incorporated by reference herein in its entirety.

As mentioned above, a cloud detector system of certain aspects determines and/or predicts cloud status in terms of parameters such as optical density, size (if any), distance from the building, speed of clouds, and consistency of cloud coverage. In some cases, other parameters such as height, geometry, and makeup of a cloud or clouds may also be determined. In one case, a cloud detector system may determine consistency of coverage based on measured density/opacity of the clouds.

In certain aspects, a cloud detector system may use data from existing sensors and/or satellite images or other weather forecast data to determine cloud status.

Figure 10:
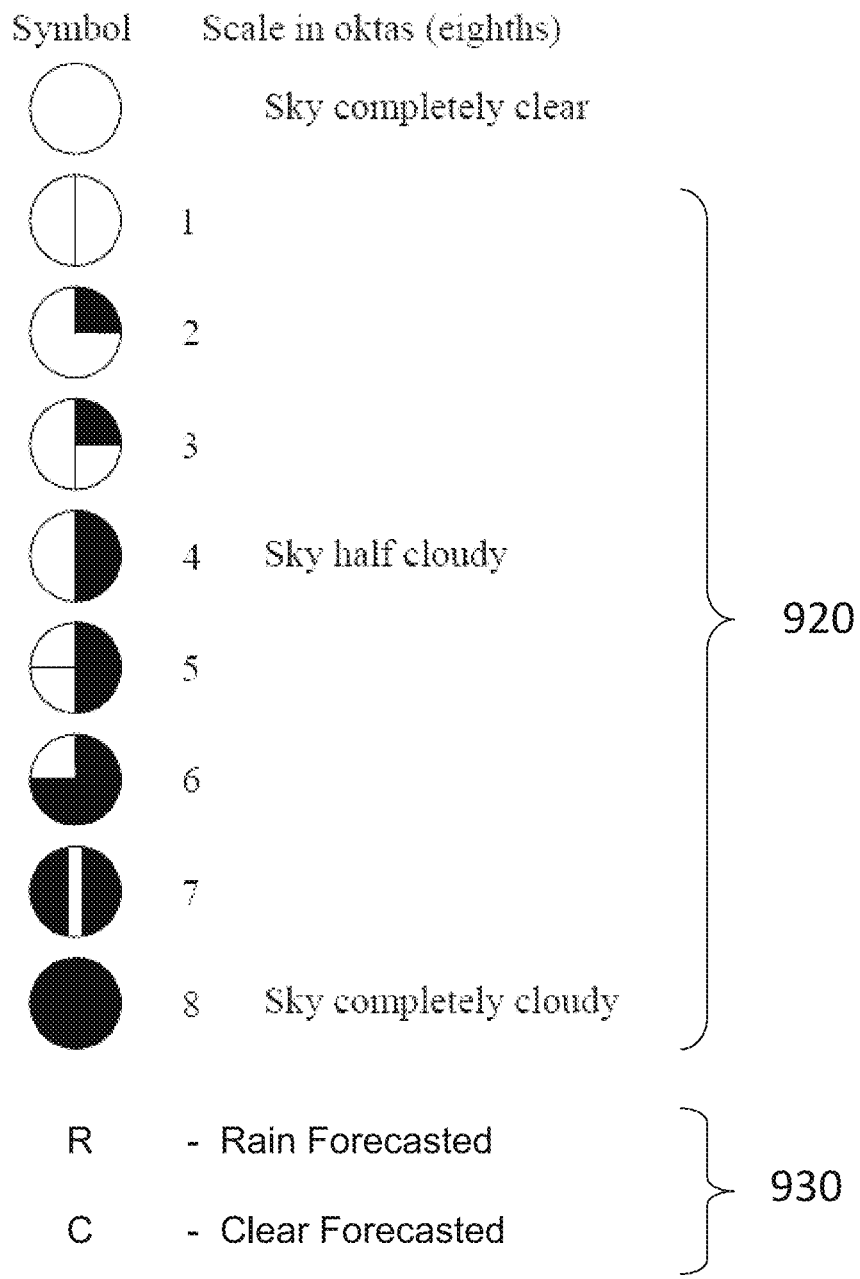
FIG. 10 is a chart showing different levels of cloud cover consistency and weather forecast modifiers, according to embodiments.

In some cases, the cloud status includes a cloud consistency classification and/or a weather forecast such as rain, snow, sleet, clear, or other weather conditions. FIG. 10 is a chart showing an example of eight cloud consistency classifications 1020 and weather forecast modifiers 1030, according to an embodiment.

In the chart shown in FIG. 10, cloud cover consistency is categorized by the amount of cloud cover ranging from 1 (least cloudy) to 8 (Sky completely cloudy i.e. overcast). This chart also has weather forecast classification modifiers 9 and 10 for rain and clear weather conditions. The cloud detector system may determine the weather conditions may be based on the weather forecast data, for example. In certain cases, these levels of cloud cover consistency may be based on values or ranges of values of density/opacity of the cloud cover. In a method of operation that uses the classifications shown in FIG. 10, a cloud detector system would use its sensor measurements and/or other weather forecast data (e.g., satellite data) to determine cloud consistency and/or the probability of rain or clear. The cloud detector system would then determine the associated cloud classification and/or weather forecast modifier of rain or clear.

In certain aspects, the cloud status parameters determined by a cloud detector system may be used as input to predictive logic to control building systems or other control systems. In some cases, certain combinations of the output values of cloud status parameters map to certain control decisions. For example, a value of cloud cover consistency of 8 (completely cloudy) shown in FIG. 10 may correspond to a tint decision that will "clear" an electrochromic window in a building. In another example, a cloud cover consistency value of higher than a certain value (e.g., above 4) shown in FIG. 10 may override the current tint decision and lower the tint state (e.g., override decision to clear). In another example, a cloud cover consistency value of lower than a certain cloud classification (e.g., lower than 3) shown in FIG. 10 may maintain the current tint state. In another example, a weather forecast modifier of 9 may correspond to a control decision to close an observatory dome to protect its equipment from impending rain.

As mentioned in various examples above, determined/predicted cloud status parameter(s) can be used as input to logic for controlling building systems such as an electrochromic window control system. For example, a cloud classification of "low-lying clouds/fog" may be used as input to determine that tint levels in electrochromic windows should be held at their current low level, and that a standby alert be established for possible quick clearing/sunshine to change tint level. As another example, a cloud classification of "generally overcast, high wispy clouds, hazy with low light levels" may be used as input to logic for controlling tint levels in electrochromic windows. If the clouds clear to sun, the logic will increase tint level, but will delay returning to the lower tint level when the clouds return in anticipation of another clearing. As another example, a cloud category of "big white puffy intermittent clouds on a generally sunny day," may be used as input to logic for controlling tint levels in electrochromic windows. In this case, depending on the bias settings, the window control logic will delay clearing the windows in anticipation that the puffy clouds are intermittent and will return to sunny conditions soon. As another example, a cloud category of "dark heavy cloud front, low pressure system, storm clouds moving in," may be used as input to logic for controlling tint levels in electrochromic window. In this example, the control logic will lower the tint level since the cloud category will remain for an extended period.

In some embodiments, the cloud detector system can predict snow weather condition. A snow condition may cause a wide angle of glare on windows of a building due to reflection from snow. In one example, the window and heating control systems of a building can use an indication of a snow weather condition from a cloud detector system to adjust the glare entering the windows of the building and/or adjust the heat load in the building.

Sources of Weather Forecast Data

According to certain aspects, the cloud detector system can determine a cloud status including weather forecast data which can be based on data from one or more sources. Some examples of such sources are discussed below.

1. Weather prediction from a forecast service. For example, a weather forecast service may provide data that forecasts rain or clear skies at particular times/days.

2. Satellite image "Looking Down" data showing clouds and history of cloud evolution and movement. Satellite image data can be provided in terms of infrared and/or visible wavelengths to allow the cloud detector system to determine both cloud density and the amount of extraterrestrial radiation that will be transmitted a cloud.

3. Sensor "Looking Up" data from either sensors of the cloud detector system or other sensors at or near the building.

4. High altitude radar can also provide weather data. An example of such a system can be found at http://har.gsfc.nasa.gov. 4. Other sources of weather data can be from devices such as a spectroradiometer, a pyronometer, a digital camera sky imager, solar panel systems, and an optical fiber ceilometer.

Part C—Solar Panel Generation Data

In certain building locations, there may be nearby solar panels converting solar radiation to electrical or thermal energy. The level of electrical energy generated by a set of one or more solar panels at any given time may be used by a cloud detector system to determine the current solar irradiance level and/or to determine/predict cloud status. When compared against solar installation capacity or historical output parameters, the real time solar panel generation data serves as a surrogate for direct sun exposure measurement by a dedicated solar radiation sensor. That is, less than maximum generation of electrical energy by the solar panels may indicate cloud cover.

For example, a cloud detector system may determine clear sky conditions based on a reporting that electrical energy generation nears or meets a seasonal maximum or design capacity. Building system control logic that make decisions based on clear sky conditions (e.g., using a solar calculator) would receive this clear sky indication from the cloud detector system. This clear sky indication would mean that no override the current decisions based on clear skies is necessary. If however, the reported electrical energy generation diminishes below the design or seasonal maximum, it may be that the skies are cloudy. In this case, this indication of cloudy skies may be input to the building system control logic to override the decisions based on a clear sky condition. In one case, the cloud detector system may use local or regional solar panel energy generation data to determine solar irradiance readings and/or cloud status instead of using its own sensor data.

A technical advantage of such a system is that it may be able to eliminate the need for installing, integrating, and commissioning sensors at the building. Since building sensors are sometimes installed independently from other building systems, the sensors may be subject to undiagnosed failure or undiagnosed drift during extended operation. Eliminating building sensors may improve reliability of the cloud detector system and reduce installation, operational, and maintenance costs for the sensors and its support equipment.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A building control system for controlling one or more building systems, the building control system comprising:
   a detector having a first sensor configured to obtain infrared intensity measurements from the sky and a second sensor configured to obtain sunlight intensity measurements from the sky; and
   control logic configured to (i) determine a weather condition based on the infrared and sunlight intensity measurements and (ii) set one or more levels of the one or more building systems based on the weather condition determined.

2. The building control system of claim 1, wherein the infrared and sunlight intensity measurements are obtained from spatially different regions of the sky.

3. The building control system of claim 1, wherein the infrared and sunlight intensity measurements are obtained from the same region of the sky.

4. The building control system of claim 1, wherein the first sensor comprises an infrared sensor, and wherein the second sensor comprises a visible light sensor.

5. The building control system of claim 4, wherein the visible light sensor is selected from the group consisting of: a photosensor, a CCD sensor, and a solar panel.

6. The building control system of claim 1, wherein the one or more building systems comprises one or more optically switchable windows.

7. The building control system of claim 6, wherein the one or more optically switchable windows comprises at least one electrochromic window.

8. The building control system of claim 6, wherein the control logic is configured to set tint levels of the one or more optically switchable windows.

9. The building control system of claim 1, wherein the first sensor is configured to take infrared intensity measurements in a wavelength range between 6.6 μm and 20 μm.

10. The building control system of claim 1, wherein the control logic is configured to control the one or more building systems based also on inputs from a solar calculator.

11. The building control system of claim 1, wherein the control logic is configured to control the one or more building systems based also on a predicted cloud cover.

12. The building control system of claim 11, wherein control of the one or more building systems is initiated 30 to 40 minutes before the predicted cloud cover.

13. The building control system of claim 1, wherein the first sensor is configured to measure a field of view of 120 degrees of the sky.

14. The building control system of claim 1, wherein the first sensor is configured to point toward the zenith.

15. The building control system of claim 1, wherein the weather condition is a cloud condition.

16. The building control system of claim 1, wherein the control logic is configured to predict the weather condition in the future.

17. The building control system of claim 16, wherein the control logic is configured to initiate setting the one or more levels of the one or more building systems 30 minutes to 40 minutes before the predicted weather condition.

18. The building control system of claim 1, wherein the first sensor and the second sensor are directed to the sky.

19. A method of controlling one or more building systems, the method comprising:
   directing a first sensor to obtain infrared intensity measurements from the sky;
   directing a second sensor to obtain sunlight intensity measurements from the sky; and
   using control logic to (i) determine a weather condition based on the infrared and sunlight intensity measurements and (ii) set one or more levels of the one or more building systems based on the weather condition determined.

20. The method of claim 19, wherein the infrared and sunlight intensity measurements are obtained from spatially different regions of the sky.

21. The method of claim 19, wherein the infrared and sunlight intensity measurements are obtained from the same region of the sky.

22. The method of claim 19, wherein the first sensor comprises an infrared sensor, and wherein the second sensor comprises a visible light sensor.

23. The method of claim 22, wherein the visible light sensor is selected from the group consisting of: a photosensor, a charge coupled device (CCD) sensor, and a solar panel.

24. The method of claim 19, wherein the one or more building systems comprises one or more optically switchable windows.

25. The method of claim 24, wherein the one or more optically switchable windows comprises at least one electrochromic window.

26. The method of claim 24, further comprising controlling tint levels of the one or more optically switchable windows.

27. The method of claim 19, wherein the first sensor is directed to obtain infrared intensity measurements in a wavelength range between 6.6 µm and 20 µm.

28. The method of claim 19, further comprising using the control logic to control the one or more building systems based also on input from a solar calculator.

29. The method of claim 19, further comprising making a prediction of cloud cover in the future.

30. The method of claim 29, further comprising initiating control of the one or more building systems 30 to 40 minutes before the predicted cloud cover.

31. The method of claim 19, wherein the first sensor is configured to measure a field of view of 120 degrees of the sky.

32. The method of claim 19, wherein the first sensor is configured to point toward the zenith.

33. The method of claim 19, wherein the weather condition is a cloud condition.

34. The method of claim 19, wherein the weather condition is predicted to occur at a future time.

35. The method of claim 34, wherein setting the one or more levels of the one or more building systems is initiated 30 minutes to 40 minutes before the future time at which the weather condition is predicted to occur.

* * * * *